(12) United States Patent
Yoder et al.

(10) Patent No.: US 8,399,858 B2
(45) Date of Patent: Mar. 19, 2013

(54) PORTABLE DOSIMETER

(75) Inventors: R. Craig Yoder, Crown Point, IN (US); Mark J. Guttag, Fairfax, VA (US)

(73) Assignee: Landauer, Inc., Glenwood, IL (US)

( * ) Notice: Subject to any disclaimer, the term of this patent is extended or adjusted under 35 U.S.C. 154(b) by 15 days.

(21) Appl. No.: 13/232,053

(22) Filed: Sep. 14, 2011

(65) Prior Publication Data

US 2012/0061591 A1 Mar. 15, 2012

Related U.S. Application Data

(60) Provisional application No. 61/383,016, filed on Sep. 15, 2010.

(51) Int. Cl.
*G01T 1/04* (2006.01)
(52) U.S. Cl. .................................. 250/473.1
(58) Field of Classification Search .............. 250/473.1
See application file for complete search history.

(56) References Cited

U.S. PATENT DOCUMENTS

| | | | |
|---|---|---|---|
| 5,731,590 | A | 3/1998 | Miller |
| 6,127,685 | A | 10/2000 | Yoder et al. |
| 6,198,108 | B1 | 3/2001 | Schweitzer et al. |
| 6,268,602 | B1 | 7/2001 | Seiwatz et al. |
| 6,528,803 | B1 | 3/2003 | Ritt |
| 6,846,434 | B2 | 1/2005 | Akselrod |
| 2004/0159803 | A1 | 8/2004 | Akselrod et al. |
| 2011/0168920 | A1 | 7/2011 | Yoder |
| 2011/0168921 | A1 | 7/2011 | Yoder |

FOREIGN PATENT DOCUMENTS

JP 2006-266880 10/2006

OTHER PUBLICATIONS

Yukihara et al., "Medical applications of optically stimulated luminescence dosimeters (OSLDs)," 2010, Radiation Measurements, vol. 45, pp. 658-662.*
Carcer et al., "KCl:Eu2+ as a solar UV-C radiation dosimeter. Optically stimulated luminescence and thermoluminescence analyses," 2009, Journal of Rare Earths, vol. 27, No. 4, pp. 579-583.*
Mittani et al., "Investigation of neutron converters for production of optically stimulated luminescence (OSL) neutron dosimeters using Al2O3:C," 2007, Nuclear Instruments and Methods in Physics Research B, vol. 260, pp. 663-671.*
Search Report and Written Opinion received in PCT/IB2011/054021 dated May 1, 2012.
Akselrod, et al. "Optically Stimulated Luminescence of $Al_2O_3$", Radiation Measurements, vol. 29, No. 3-4, pp. 391-399 (1998).
Akselrod, et al. "Preparation and Properties of $\alpha$-$Al_2O_3$:C" Radiation Protection Dosimetry, vol. 47, No. 1-4, pp. 159-164 (1993).
Botter-Jensen et al., "Optically Stimulated Luminescence Dosimetry" *Elesevier* (2003).
Klemic et al., "External Dosimetry in the Aftermath of a Radiological Terrorist Event" Radiation Protection Dosimetry, vol. 120, No. 1-4, pp. 242-249 (2006).

* cited by examiner

*Primary Examiner* — Kiho Kim
(74) *Attorney, Agent, or Firm* — Alchemy-Partners, PC; Ajay A. Jagtiani

(57) ABSTRACT

Described is a portable dosimeter that includes a piece of optically stimulated luminescence material (OSLM) mounted in a dosimeter mount that is rotatably mounted in a cylindrical recess of a dosimeter housing.

11 Claims, 13 Drawing Sheets

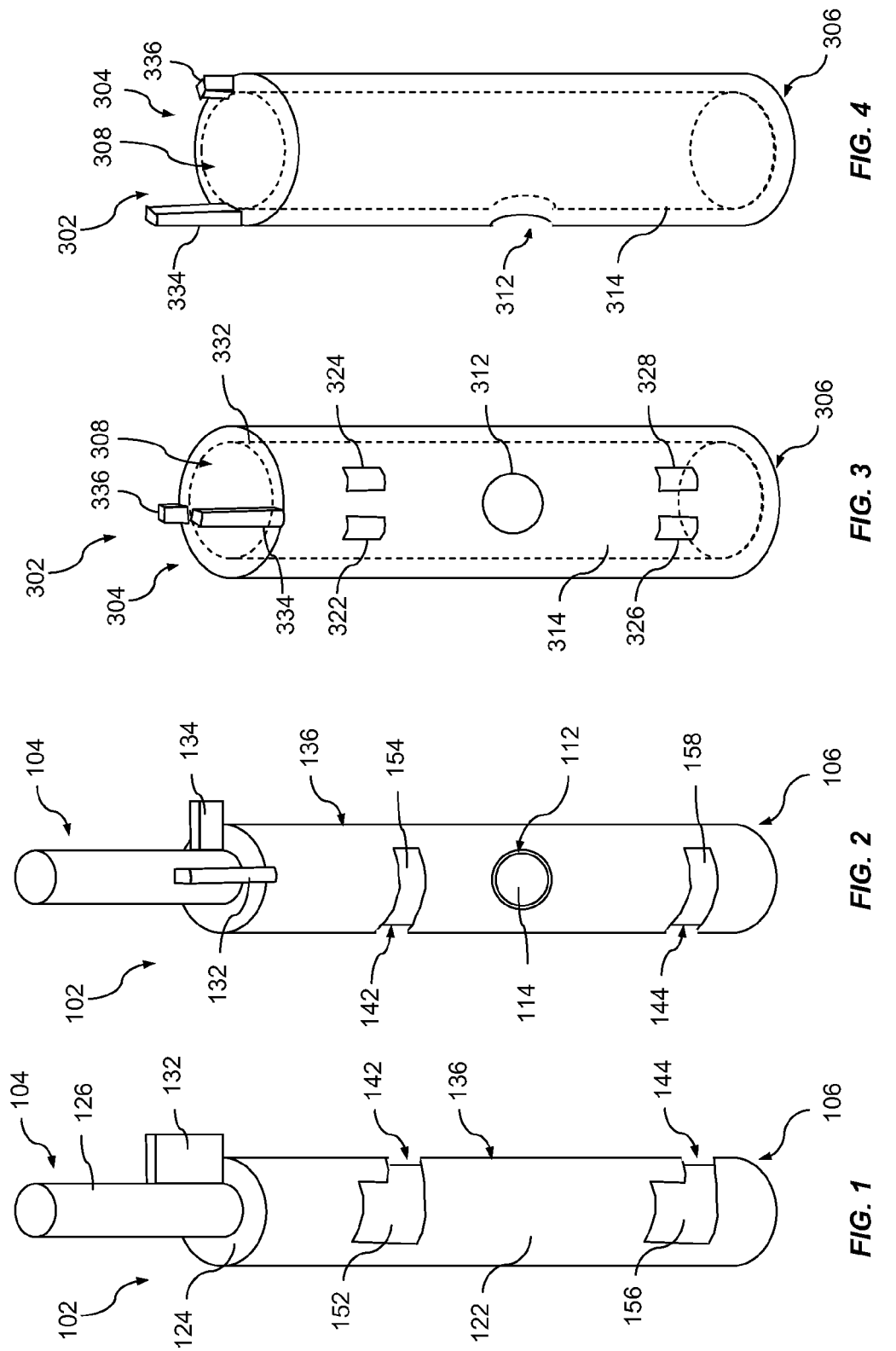

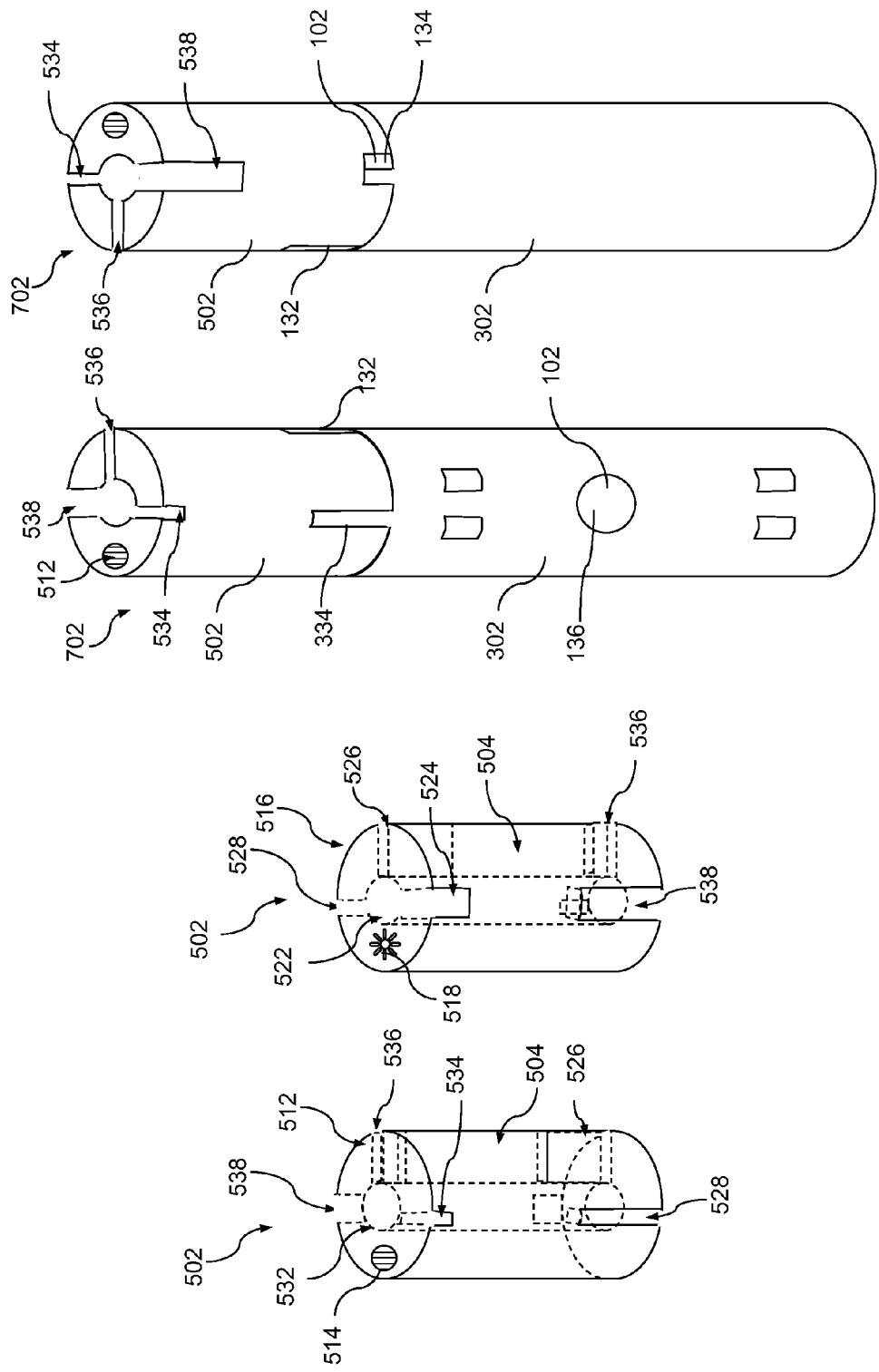

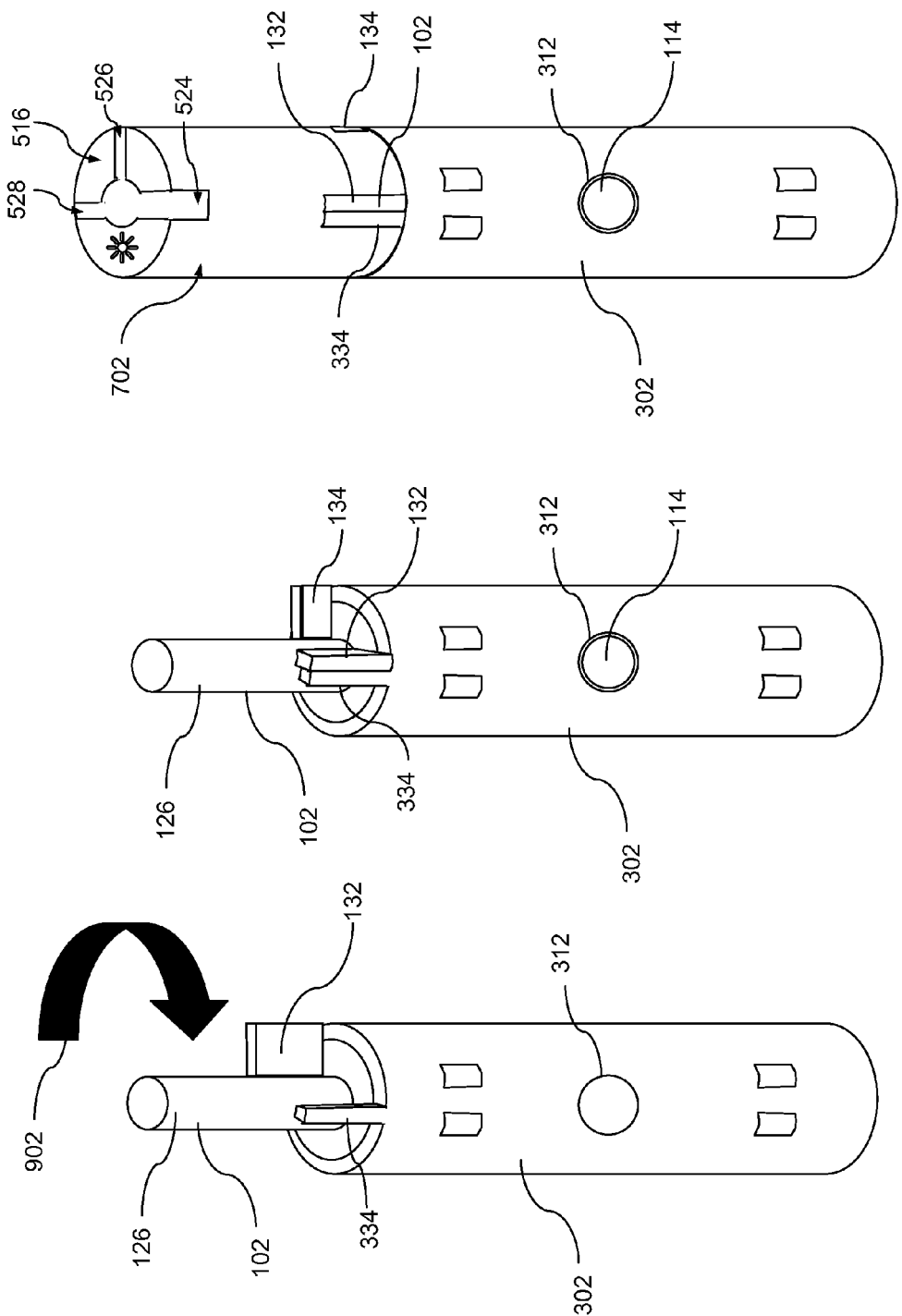

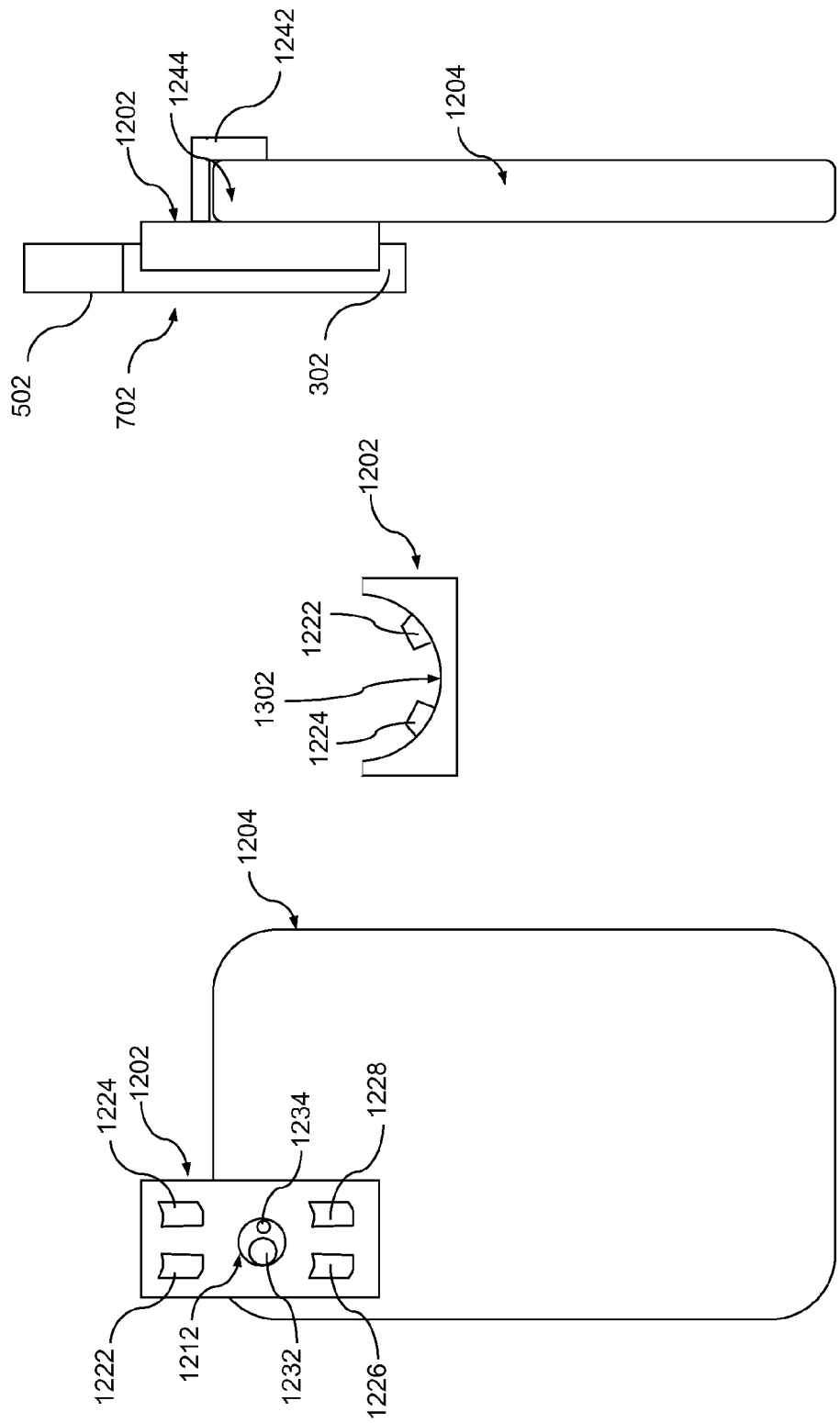

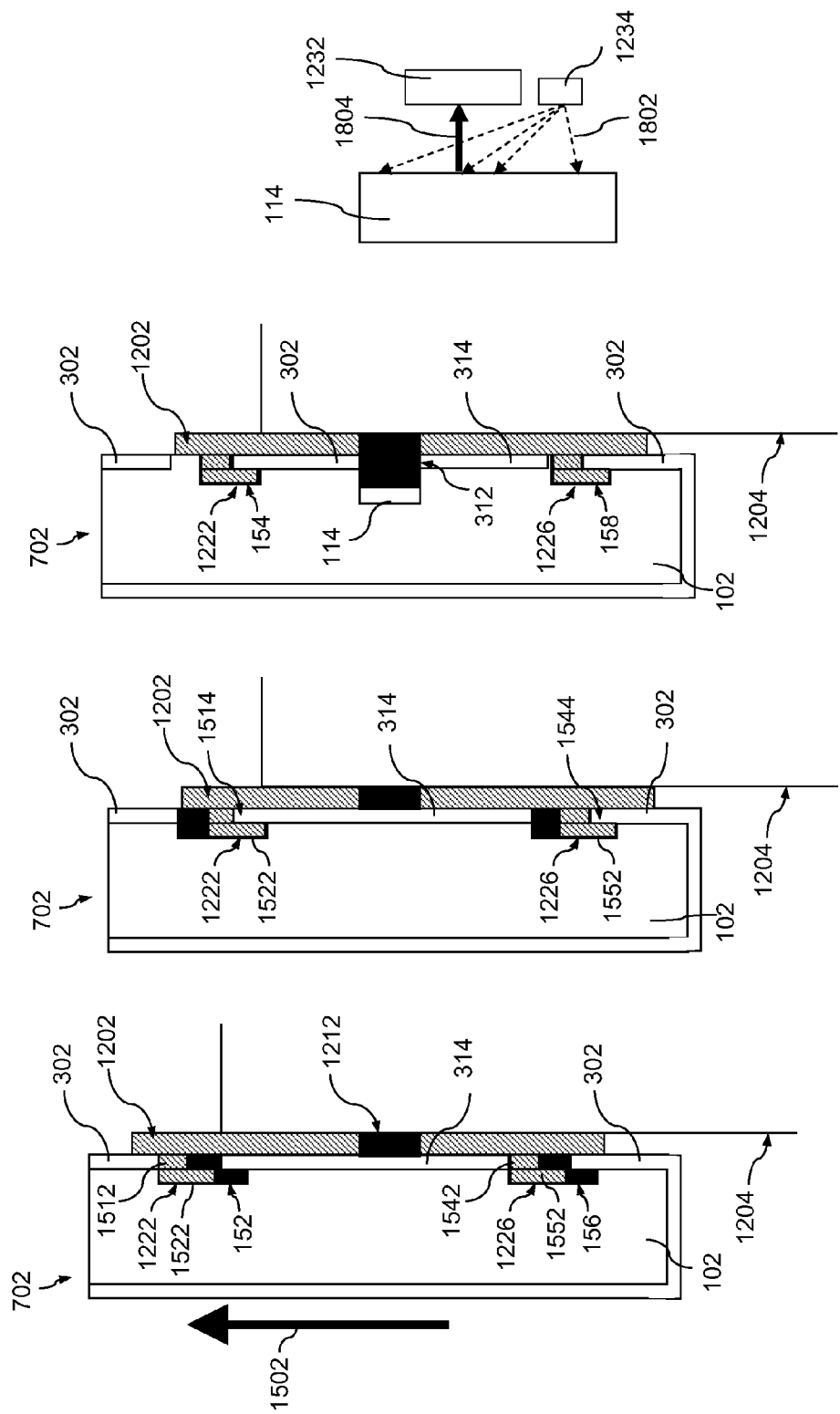

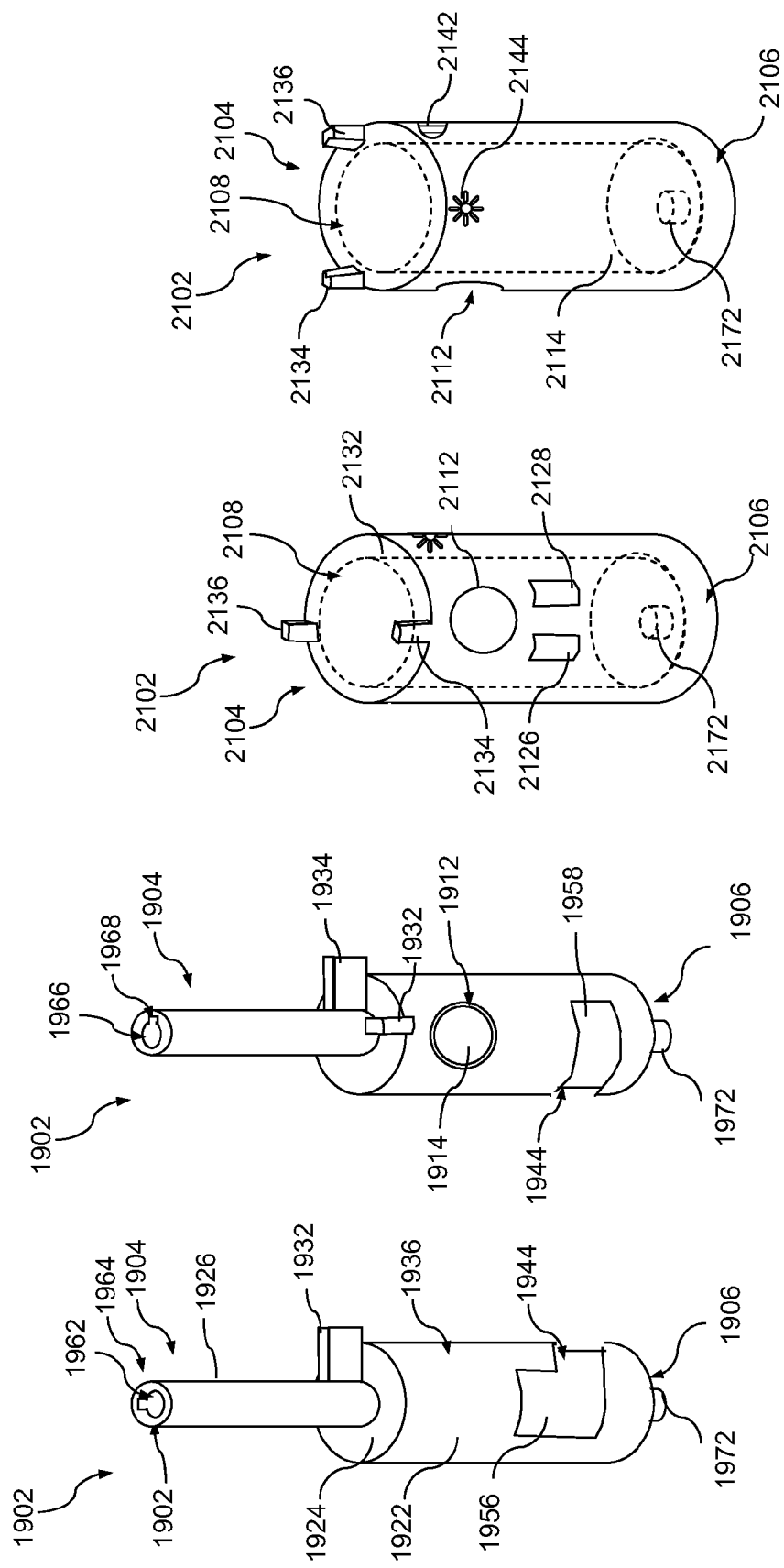

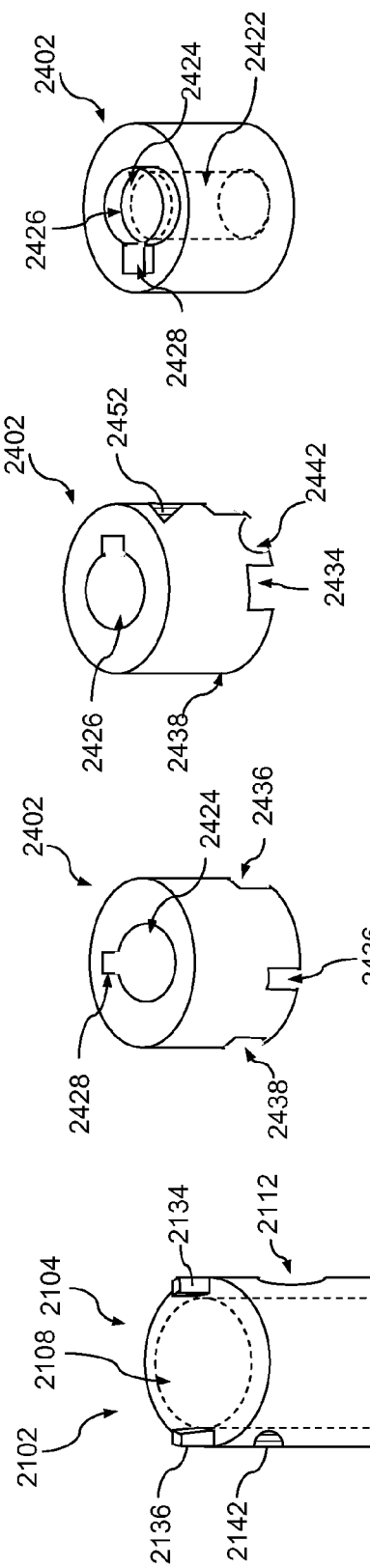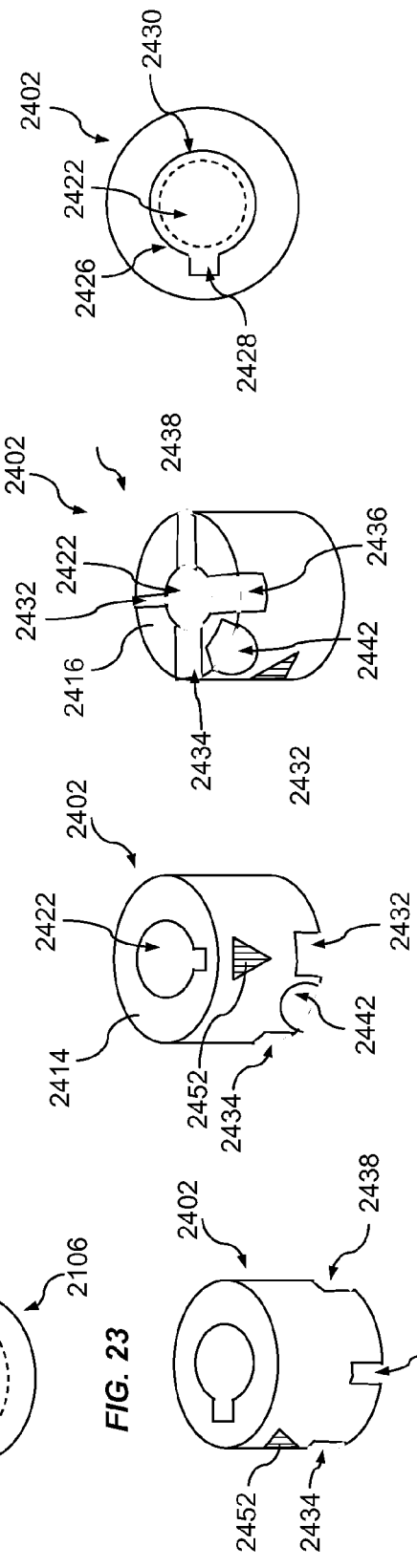

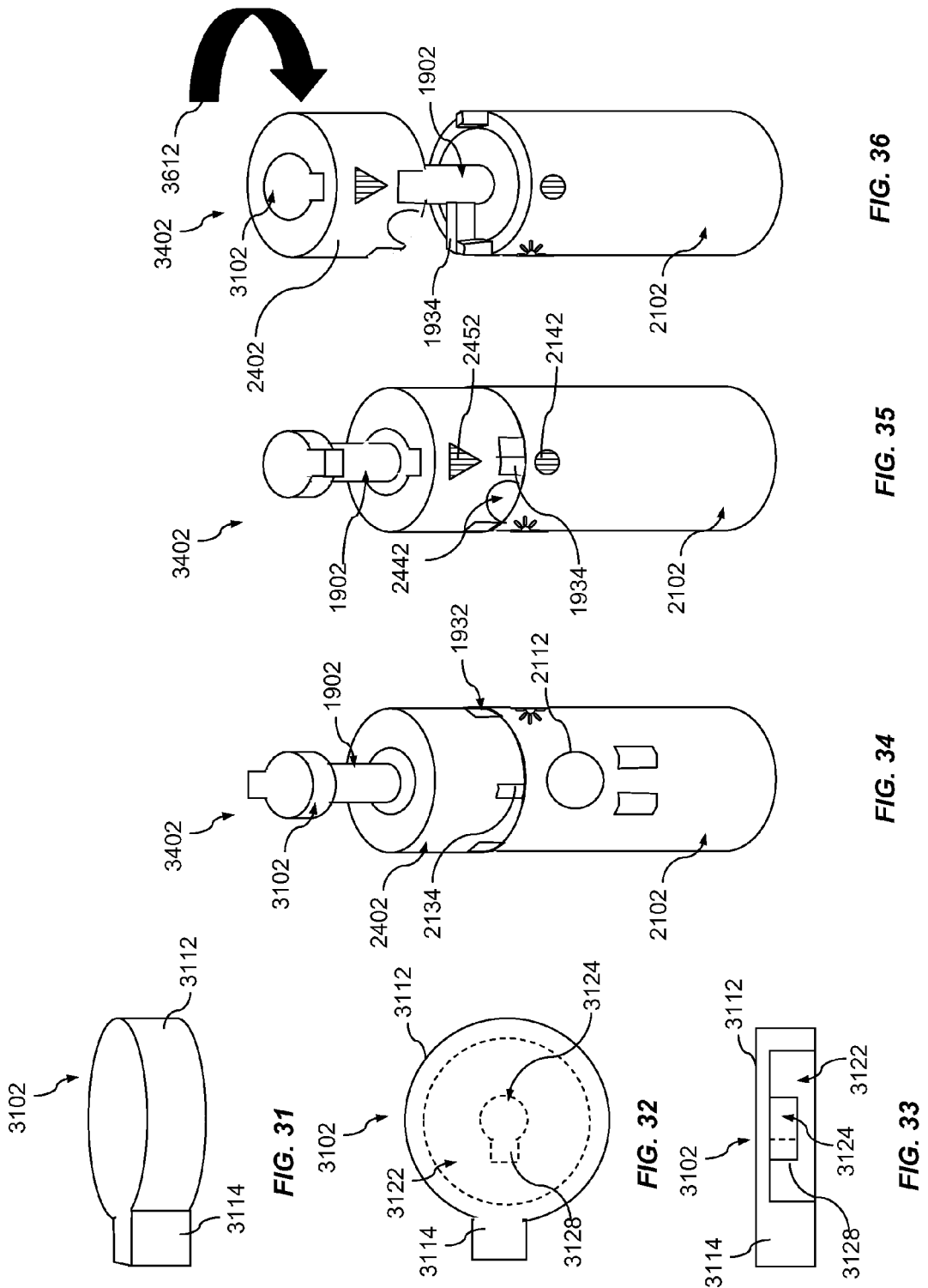

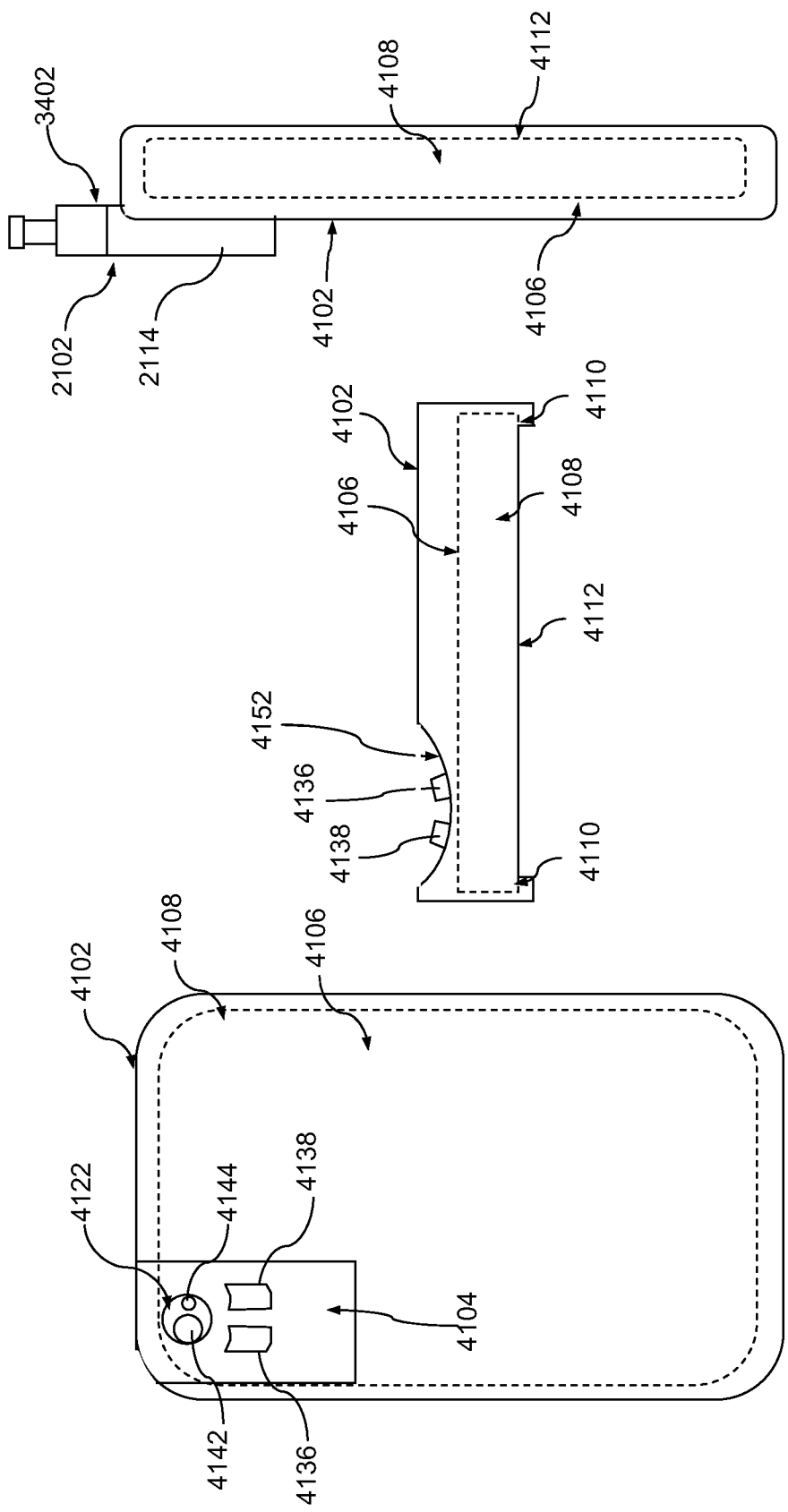

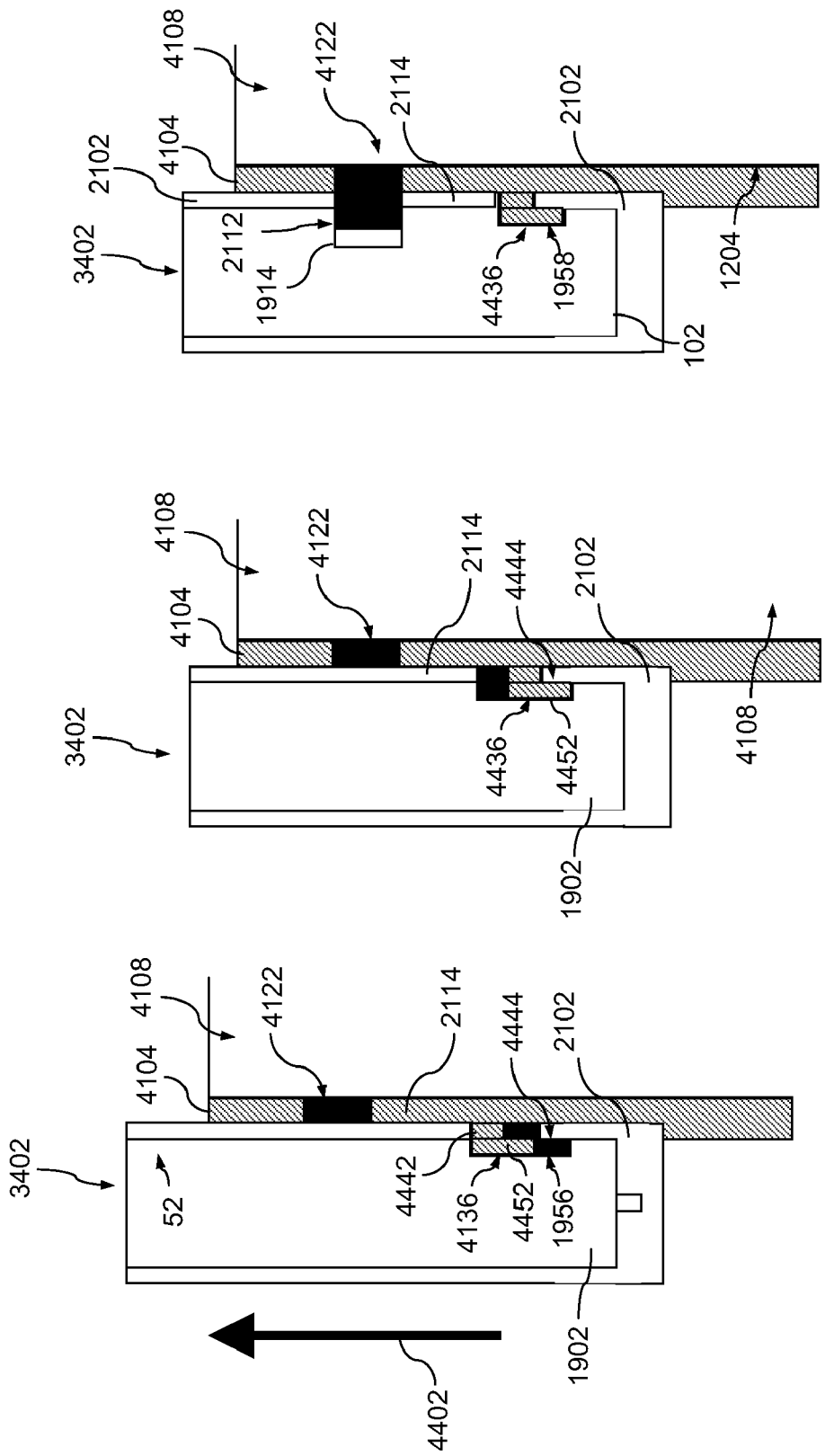

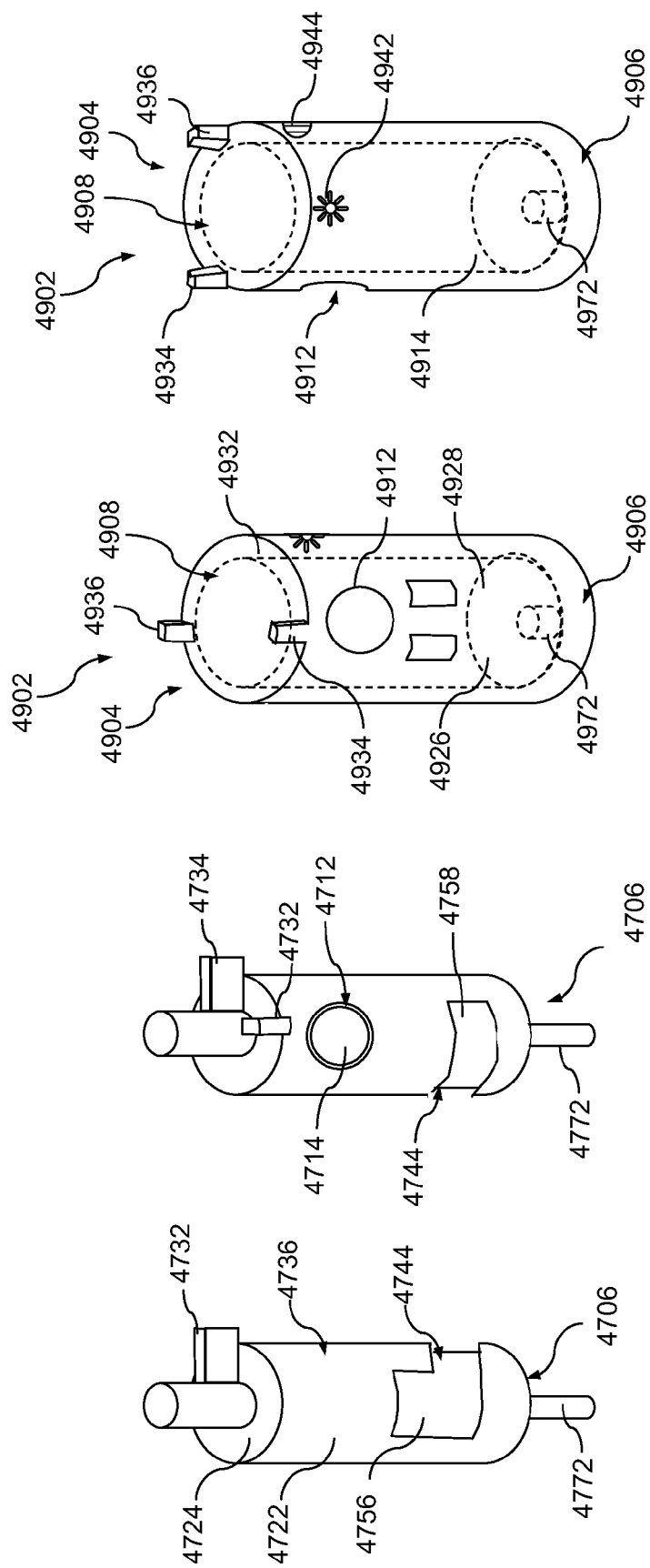

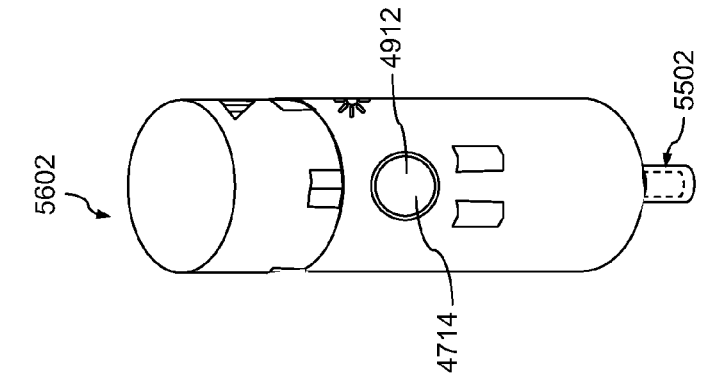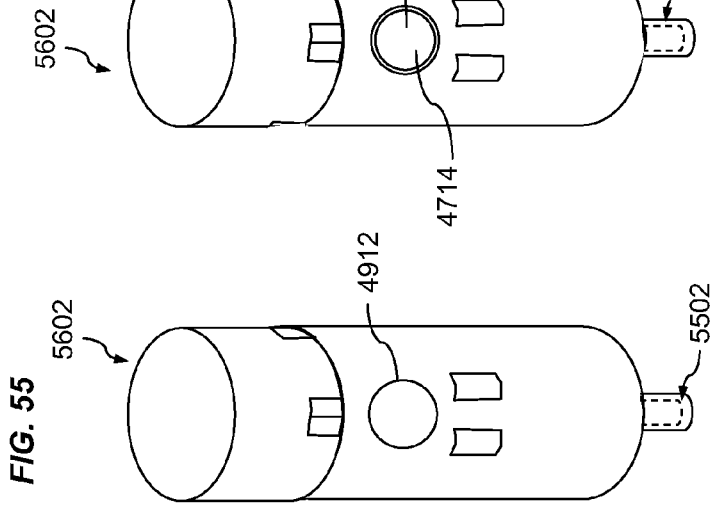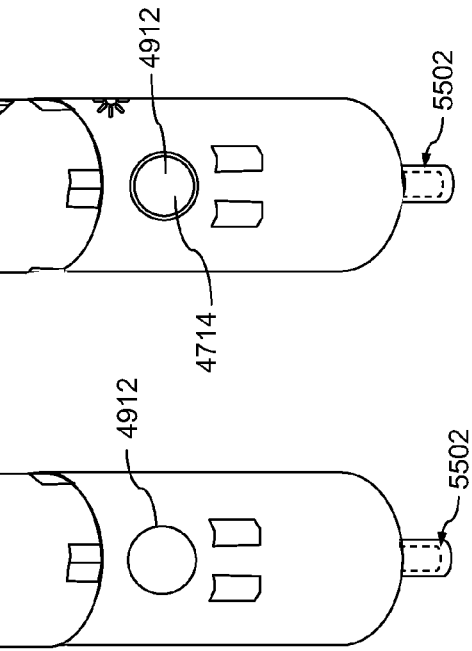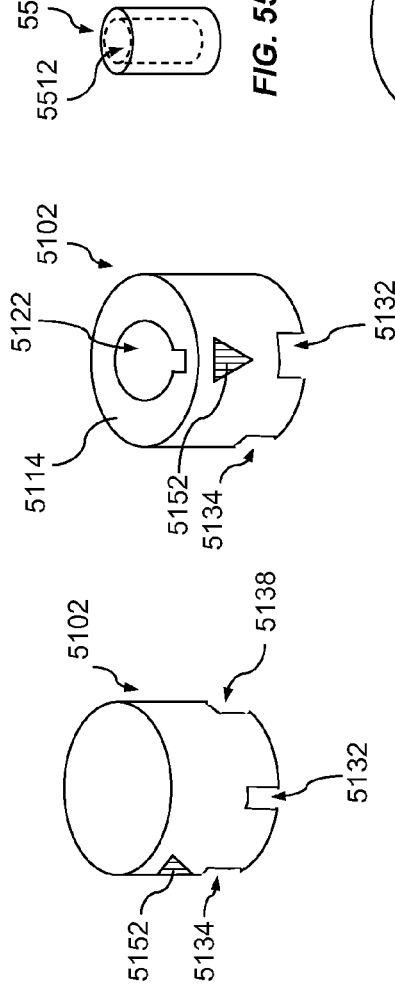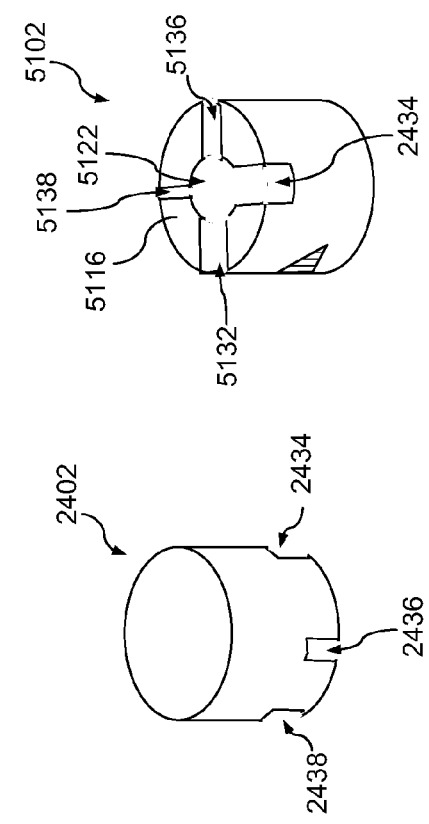

PORTABLE DOSIMETER

CROSS-REFERENCE TO RELATED APPLICATIONS

This application claims benefit of priority to U.S. Provisional Patent Application No. 61/383,016 to Koskelo, entitled "MOBILE SMART PHONE OSL READER AND TOOL," filed Sep. 15, 2010, which is incorporated herein by reference in its entirety.

BACKGROUND

1. Field of the Invention

The present invention relates to a portable dosimeter.

2. Related Art

Existing personal radiation monitoring devices using passive integrating radiation sensors require removal of the sensors from a holder before the sensors can be quantitatively evaluated using the appropriate analytical instruments or processes designed for use in a controlled laboratory setting.

SUMMARY

According to a first broad aspect, the present invention provides a device comprising: a cylindrically shaped dosimeter mount, a piece of optically stimulated luminescence material (OSLM) mounted in the dosimeter mount, a cylindrically shaped dosimeter housing comprising a cylindrical recess in which the dosimeter mount is rotatably mounted, a cylindrically shaped knob extending from a proximal end of the dosimeter mount, wherein the piece of OSLM has an exposed surface, wherein the device has an a reading configuration in which the exposed surface of the piece of OSLM is exposed in an opening of the dosimeter housing, wherein the device has a shielded configuration in which the exposed surface of the piece of OSLM is shield by the dosimeter housing, wherein the device is movable between the shielded configuration and the reading configuration by rotating the dosimeter mount relative to the dosimeter housing about a longitudinal axis by twisting the knob.

According to a second broad aspect, the present invention provides a method comprising the following steps: (a) moving a dosimeter from a shielded configuration to a reading configuration by rotating a dosimeter mount of a dosimeter about a longitudinal axis in a dosimeter housing of a dosimeter or by rotating the dosimeter housing around the dosimeter mount about the longitudinal axis, (b) exposing a piece of optically stimulated luminescence material (OSLM) in the dosimeter mount to light through an opening in a dosimeter housing, and (c) detecting radiation emitted by the piece of OSLM in response to step (b).

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

FIG. 1 is a perspective view of a dosimeter mount according to one embodiment of the present invention.

FIG. 2 is perspective view of the dosimeter mount of FIG. 1 rotated about 90° from the view of FIG. 1.

FIG. 3 is a perspective view of a dosimeter housing according to one embodiment of the present invention.

FIG. 4 is perspective view of the dosimeter housing of FIG. 3 rotated about 90° from the view of FIG. 3.

FIG. 5 is a perspective view of a shielded configuration end of a dosimeter cap according to one embodiment of the present invention.

FIG. 6 is a perspective view of a reading configuration end of the dosimeter cap of FIG. 5.

FIG. 7 is a perspective view of a dosimeter in a shielded configuration according to one embodiment of the present invention.

FIG. 8 is a perspective view of the dosimeter of FIG. 7 in a shielded configuration and rotated about 180° from the view of FIG. 3.

FIG. 9 is a perspective view of the dosimeter of FIG. 7 in a shielded configuration with the dosimeter cap removed.

FIG. 10 is a perspective view of the dosimeter of FIG. 7 in a reading configuration with the dosimeter cap removed.

FIG. 11 is a perspective view of the dosimeter of FIG. 7 in a reading configuration with the dosimeter cap mounted on the dosimeter mount and dosimeter housing of the dosimeter.

FIG. 12 is a plan schematic view of a dosimeter reader mount mounted on a smartphone according to one embodiment of the present invention.

FIG. 13 is a top plan schematic view of the dosimeter reader mount of FIG. 12.

FIG. 14 is side plan schematic view of a dosimeter mounted in the dosimeter mount of FIG. 12.

FIG. 15 is a cross-sectional view of a dosimeter in a shielded configuration being mounted on the dosimeter reading mount of FIG. 12, with various features of the dosimeter omitted for simplicity of illustration.

FIG. 16 is a cross-sectional view of a dosimeter in a shielded configuration mounted on the dosimeter reading mount of FIG. 12, with various features of the dosimeter omitted for simplicity of illustration.

FIG. 17 is a cross-sectional view of a dosimeter in a reading configuration mounted on the dosimeter reading mount of FIG. 12, with various features of the dosimeter omitted for simplicity of illustration.

FIG. 18 is a schematic view of an OSLM disc being illuminated by an LED and read by a camera of the smartphone of FIG. 12.

FIG. 19 is a perspective view of a dosimeter mount according to one embodiment of the present invention.

FIG. 20 is perspective view of the dosimeter mount of FIG. 1 rotated about 90° from the view of FIG. 19.

FIG. 21 is a perspective view of a dosimeter housing according to one embodiment of the present invention.

FIG. 22 is perspective view of the dosimeter housing of FIG. 21 rotated about 90° from the view of FIG. 21.

FIG. 23 is perspective view of the dosimeter housing of FIG. 21 rotated about 180° from the view of FIG. 21.

FIG. 24 is a top perspective view of a dosimeter cap according to one embodiment of the present invention.

FIG. 25 is a top perspective view of the dosimeter cap of FIG. 24 rotated about 90° from the view of FIG. 24.

FIG. 26 is a top perspective view of the dosimeter cap of FIG. 24 rotated about 90° from the view of FIG. 24 and in the opposite direction from FIG. 25.

FIG. 27 is a top perspective view of the dosimeter cap of FIG. 24 rotated about 180° from the view of FIG. 24.

FIG. 28 is a bottom perspective view of the dosimeter cap of FIG. 24.

FIG. 29 is a top perspective view of the dosimeter cap of FIG. 24, with various features omitted and internal detail shown.

FIG. 30 is a top plan view of the dosimeter cap of FIG. 24.

FIG. 31 is side perspective view of a cap stop according to one embodiment of the present invention.

FIG. 32 is a bottom plan view of the cap stop of FIG. 31.

FIG. 33 is a cross-sectional view of the cap stop of FIG. 31.

FIG. 34 is a perspective view of a dosimeter in a shielded configuration according to one embodiment of the present invention.

FIG. 35 is a perspective view of the dosimeter of FIG. 35 in a shielded configuration and rotated about 180° from the view of FIG. 35.

FIG. 36 is a perspective view of the dosimeter of FIG. 36 with a dosimeter cap of the dosimeter engaging a cap stop of the dosimeter.

FIG. 41 a plan schematic view of a smartphone cover according to one embodiment of the present invention covering the back of the smartphone and including a dosimeter reading mount.

FIG. 42 is a cross-sectional schematic view of the dosimeter reading mount and the smartphone of FIG. 41.

FIG. 43 is side plan view of a dosimeter mounted in the dosimeter reading mount of FIG. 41.

FIG. 44 is a cross-sectional view of a dosimeter in a shielded configuration being mounted on the dosimeter reading mount of FIG. 41, with various features of the dosimeter omitted for simplicity of illustration.

FIG. 45 is a cross-sectional view of a dosimeter in a shielded configuration mounted on the dosimeter reading mount of FIG. 41, with various features of the dosimeter omitted for simplicity of illustration.

FIG. 46 is a cross-sectional view of a dosimeter in a reading configuration mounted on the dosimeter reading mount of FIG. 41, with various features of the dosimeter omitted for simplicity of illustration.

FIG. 47 is a perspective view of a dosimeter mount according to one embodiment of the present invention.

FIG. 48 is perspective view of the dosimeter mount of FIG. 47 rotated about 90° from the view of FIG. 47.

FIG. 49 is a perspective view of a dosimeter housing according to one embodiment of the present invention.

FIG. 50 is perspective view of the dosimeter housing of FIG. 49 rotated about 90° from the view of FIG. 49.

FIG. 51 is a top perspective view of a dosimeter cap according to one embodiment of the present invention.

FIG. 52 is a top perspective view of the dosimeter cap of FIG. 51 rotated about 90° from the view of FIG. 51.

FIG. 53 is a top perspective view of the dosimeter cap of FIG. 51 rotated about rotated about 180° from the view of FIG. 51.

FIG. 54 is a bottom perspective view of the dosimeter cap of FIG. 51.

FIG. 55 is a perspective view of an axle cap according to one embodiment of the present invention.

FIG. 56 is a perspective view of dosimeter in a shielded configuration according to one embodiment of the present invention.

FIG. 57 is a perspective view of the dosimeter of FIG. 56 in a reading configuration.

DETAILED DESCRIPTION OF THE PREFERRED EMBODIMENTS

Definitions

Figure 40:
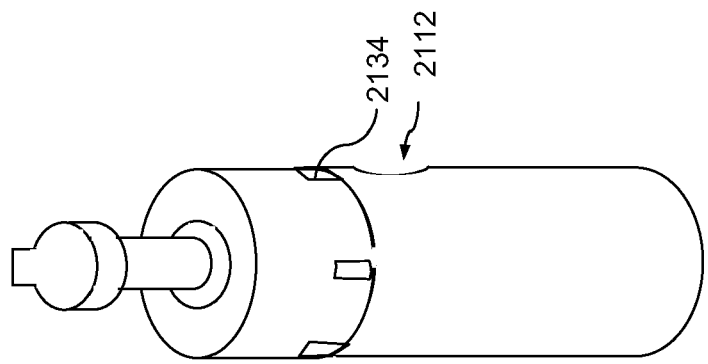
FIG. 40 is a perspective view of the dosimeter of FIG. 38 in a reading configuration and rotated about 180° from the view of FIG. 38.

Where the definition of terms departs from the commonly used meaning of the term, applicant intends to utilize the definitions provided below, unless specifically indicated.

For purposes of the present invention, directional terms such as "top," "bottom," "upper," "lower," "above," "below," "left," "right," "horizontal," "vertical," "upward," "downward," etc., are merely used for convenience in describing the various embodiments of the present invention.

For purposes of the present invention, a value or property is "based" on a particular value, property, the satisfaction of a condition, or other factor, if that value is derived by performing a mathematical calculation or logical decision using that value, property or other factor.

For purposes of the present invention, the term "angle of incidence" refers to the angle between the direction of the radiation trajectory and a line perpendicular (normal) to the detector surface.

For purposes of the present invention, the term "close proximity" refers to a distance comparable with the penetration range of charged particles in a particular medium.

For purposes of the present invention, the term "complementary engaging structures" refers to a pair of engaging structures that are designed to engage each other in a complementary fashion. Examples of pairs of complementary engaging structures include: a tab and a recess, a tab and an undercut, a ridge and groove, etc.

For purposes of the present invention, the term "converter material" refers to a converter material that can convert non-ionizing neutron radiation into recoil or knockout protons, which can be detected by an optically stimulated luminescence (OSL) sensor or include a fluorescent nuclear track detector (FNTD). An example of a "converter material" is high-density polyethylene (HDPE). Another example of a "converter material" is polyethylene (PE). In some embodiments of the present invention, a converter material may be applied as a thin coating on an OSLM or be mounted as a thin film or disc adjacent to the OSLM of a neutron-sensitive OSLM sensor. In one embodiment of the present invention, the converter material may be in the form of a disc that is mounted between the OSLM and the base of a cylindrical cup-shaped filter in which the OSLM is mounted. In one embodiment of the present invention, the body of a dosimeter mount is made of a converter material such as HDPE or PE so that the entire dosimeter mount may act as converter material for an OSLM mounted in the dosimeter mount. In another embodiment of the present invention, the OSLM may be mixed with the converter material so that the OSLM is embedded or suspended in the converter material.

For purposes of the present invention, the term "cylindrically cup-shaped" refers to a filter having the general shape of a right cylinder with the top or bottom of the cylinder removed, i.e., the filter has a disc-shaped bottom or top and a cylindrical wall extending therefrom. The walls, top or bottom may be formed from the same material or different materials depending on the angular and energy compensation response to radiation desired for the dosimeter.

For purposes of the present invention, the term "cylindrically shaped" refers to an object that is generally cylindrical in shape. A cylindrically shaped object may be hollow, solid, partially hollow, include recesses, include engaging structures on an interior and/or an exterior surface, etc.

For the purposes of the present invention, the term "distal end" refers to the end of the dosimeter that is opposite the proximal end, i.e., the end of the dosimeter away from the knob of the dosimeter.

For purposes of the present invention, the term "dosimetric parameter" refers to the value or the number determined from processing the fluorescent image or signal of irradiated luminescent material and is directly related to the dose of radiation absorbed by the detector.

For purposes of the present invention, the term "energy-compensating material" refers to a material that when placed between an OSLM and a source of gamma radiation or x-ray radiation alters the response over a range of gamma energies or x-ray energies compared to the OSLM exposed with no compensating or filtering material. Examples of energy-compensating materials are copper and aluminum.

For purposes of the present invention, the term "engaging structure" refers to one or more structures that are shaped to engage a complementary engaging structure. Examples of engaging structures include: tabs, hooks, openings, recesses, dimples, protrusions, ridges, grooves, etc. A single engaging structure may be formed of two pieces, such as a larger tab formed by two abutting smaller tabs of a dosimeter mount and a dosimeter housing, an undercut groove formed by a wall from a dosimeter housing and a recess from a dosimeter mount.

For purpose of the present invention, the term "exposed surface" refers to a surface of a piece of OSL material that may be exposed to light by a light source.

For purposes of the present invention, the term "fast neutron" refers to the conventional meaning of the term "fast neutrons," meaning neutrons with energies above 10 keV.

For purposes of the present invention, the term "filter" refers to any structure that is located between a radiation-sensing material, such as an OSLM, and a source of radiation and affects the radiation experienced by the radiation-sensing material. For example, a filter may be an energy-compensating filter, a converter, a reference filter, a conformal disc, etc. In one embodiment of the present invention, the energy-compensating filter may be a cylindrical cup-shaped filter. Although the filters of the present invention are primarily described below as being used with optically stimulated luminescent materials, the filters of the present invention may be used with other types of radiation-sensing materials, such as thermoluminescent dosimetry (TLD) materials. In one embodiment of the present invention in which an OSL sensor comprises an OSLM disc mounted in a cup-shaped filter, one or more filter material discs may be located between the OSLM disc and the base of the cylindrical cup-shaped filter. Each of the filter material discs would constitute a filter.

For purposes of the present invention, the term "filter material" refers to the material or materials of which a filter is comprised. For example, depending on the type of filter, a filter material may be an energy-compensating material, a converter material, a reference filter material, a conformal material, etc. Although the filter materials of the present invention are primarily described below as being used with optically stimulated luminescent materials, the filter materials of the present invention may be used with other types of radiation-sensing materials, such as TLD materials.

For purposes of the present invention, the term "hardware and/or software" refers to functions that may be performed by digital software, digital hardware, or a combination of both digital hardware and digital software.

For purposes of the present invention, the term "heavy charged particle (HCP)" refers to nuclei or ions with masses equal to or greater than a proton. Some representative, but nonlimiting, examples of heavy charged particles include: alpha particles, tritium ions, protons, recoil protons, etc.

For purposes of the present invention, the term "indirectly ionizing radiation" refers to x-rays, gamma rays or neutrons.

For purposes of the present invention, the term "ionizing radiation" refers to any particulate or electromagnetic radiation that is capable of dissociating atoms into a positively and negatively charged ion pair. The present invention may be used to determine doses of both directly ionizing radiation and indirectly ionizing radiation.

For purposes of the present invention, the term "irradiation" refers to the conventional meaning of the term "irradiation," i.e., exposure to high energy charge particles, e.g., electrons, protons, alpha particles, etc., or electromagnetic radiation of wavelengths shorter than those of visible light, e.g., gamma rays, x-rays, ultraviolet, etc.

For purposes of the present invention, the term "longitudinal axis" refers to the longest rotation axis for an object. For a dosimeter, the longitudinal axis extends from the distal end to the proximal end of the dosimeter.

For purposes of the present invention, the term "low penetrating radiation" refers to radiation from heavy charged particles having a penetration range that is less than 100 microns (100μ) in a radiation-sensing material or absorber. Examples of low penetrating radiation are: alpha particles, recoil protons, etc.

For purposes of the present invention, the term "maximum penetration range" or "penetration range" refers to the distance in the medium at which a directly ionizing particle comes to rest.

For purposes of the present invention, the term "moderated neutrons" refers to neutrons produced by slowing fast neutrons by a hydrogen- or deuterium-containing moderator and having a large contribution of low-energy neutrons in the energy range from about 0.025 eV to about 10 keV.

For purposes of the present invention, the term "neutron to proton converter" refers to a hydrogen-containing material, such as high-density polyethylene (HDPE), that may be used to convert non-ionizing neutron radiation into recoil or knockout protons, which can be detected by a radiation sensor.

For purposes of the present invention, the term "neutron-sensitive OSL sensor" refers to an OSL sensor that detects neutrons. A neutron-sensitive OSL sensor may also detect other types of radiation such as x-rays and gamma rays.

For purposes of the present invention, the term "OSL reader" refers to a device that emits a wavelength of light that stimulates an OSLM in an OSL sensor to emit light. Under a specified stimulation regime (continuous stimulation, reading wavelength and intensity, and pulsed stimulation with various pulse durations, pulse frequency, pulse shape and time between pulses), the intensity of the emitted light is proportional to the radiation exposure in a range from about 0.01 mGy (1 mrem) to over about 100 Gy (10,000 rads).

For purposes of the present invention, the term "OSL sensor" refers to a radiation sensor that is made from or includes an OSLM. OSL sensors may be read using an OSL reader.

For purposes of the present invention, the term "passive detection" refers to the detection technique that does not require any active electronic circuitry and a supply of electrical power to detect the radiation and/or integrate the radiation absorbed dose.

For purposes of the present invention, the term "penetrating photon radiation" refers to short wavelength electromagnetic radiation with energies equal to or higher than 10 keV as might originate from radioactive nuclear decay from space or produced by accelerating or decelerating of charge particles, for example, in an x-ray machine or in an accelerator.

For purposes of the present invention, the term "penetrating beta radiation" refers to electrons with energies equal to or greater than 10 keV as might originate from radioactive nuclear decay from space, or produced by radiation-induced ionization of atoms or by acceleration in an electric field.

For purposes of the present invention, the term "portion" refers to any portion of an object or material, including the entire object and material. For example, a converter that covers a "portion" of a luminescent material may cover part or all of one or more surfaces of the luminescent material.

For purposes of the present invention, the term "proximal" refers to the end of a dosimeter that is towards the knob of the dosimeter.

For purposes of the present invention, the term "radiation dosimetry" refers to the conventional meaning of the term "radiation dosimetry," i.e., the measurement of the amount of radiation dose absorbed in a material, an object or the body of an individual.

For purposes of the present invention, the term "radiation-sensing material" refers to a material used to sense radiation in a radiation sensor. Examples of radiation-sensing materials include optically stimulated luminescence materials for OSL sensors, thermoluminescent materials for thermoluminescent dosimetry (TLD) sensors, etc.

For purposes of the present invention, the term "recoil protons" refers to those protons that are generated by the collision of neutrons with a converter containing a source of hydrogen atoms, e.g. polyethylene or high-density polyethylene.

For purposes of the present invention, the term "reference filter material" refers to a non-hydrogen-containing, carbon-based material with certain optical absorption and reflection properties that has a filtering effect on x-rays and gamma rays that is similar to the radiation filtering and optical absorption and reflection effects of an organic converter material on x-rays and gamma rays. One example of a "reference filter material" is fluorinated plastic polytetrafluoroethylene (sold under the trade name Teflon® by DuPont), which has a filtering effect on x-rays and gamma rays that is similar to the neutron-to-proton converter material high-density polyethylene (HDPE). A reference filter material acts on both optical stimulation and luminescence light and is used to enhance the effectiveness of the method according to one embodiment of the present invention.

For purposes of the present invention, the term "reference OSL sensor" is an OSL sensor that includes a reference filter material and is used to determine the effects of a converter material on x-ray and gamma ray detection by another OSL sensor that is identical to the reference OSL sensor, except for the substitution of the converter material for reference filter material. In some embodiments of the present invention, the reference filter material of a reference OSL sensor may be applied as a thin coating on an OSLM or be mounted as a thin film or disc adjacent to the OSLM in a reference OSL sensor. In one embodiment of the present invention, the reference filter material may be in the form of a disc that is mounted between the OSLM and the base of a cylindrical cup-shaped filter in which the OSLM is mounted. For many radiation dosimeters, which employ three OSL sensors arranged in a row, the best angular response for the radiation dosimeter is often improved when the reference OSL sensor is the center OSL sensor. In one embodiment of the present invention, the OSLM of the reference OSL sensor may be mixed with the reference filter material so that the OSLM is embedded or suspended in the reference filter material.

DESCRIPTION

In existing personal radiation monitoring devices, the radiation sensors are generally captured in a holder containing one or more filters that alter the amounts, energies and types of radiation able to reach the sensors. These filters typically sandwich the sensors to achieve correct assessments when the radiation enters the dosimeter from various angles of incidence. To analyze the sensors, they must be removed from between the filters and holder and physically presented to the processing system required to elicit the quantitative attribute exhibited by the sensor following exposure to radiation.

For example, to analyze a film dosimeter generally involves the following steps: 1. Removing the film packet from the holder where it is sandwiched between the filters. 2. Unwrapping protective packaging that protects the film from light fogging and physical damage. 3. Developing the films in chemicals. 4. Measuring the density of the film by placing it between a light source and a light detector and comparing the transmission of light through the film to a reference condition where there is nothing placed between the light source and light detector, and. 5. Relating the density to radiation exposure in one or more areas of the film corresponding to the areas where the film was sandwiched between the filters.

Similarly, radiation sensors based on thermoluminescent dosimetry (TLD) must be removed from the holder and their position between the filters and presented to a very high temperature environment necessary to cause the sensor to emit luminescence and measure the amount of such luminescence whose intensity is proportional to the radiation dose. The required temperatures will typically burn the holder and any identifying labels, thereby necessitating the removal of the sensors from the TLD dosimeter. Most common metallic filters also create incandescence and other interfering light at the very high temperatures, e.g., 200 to 300° C. The disassembly process involves a number of mechanical steps that create operating inefficiencies. Also, because of the multiple steps in the disassembly process for a TLD dosimeter, a complex identification system is required to link a specific TLD sensor or sensors to the holder that is needed to establish an unbroken chain of custody whereby the results of the radiation dose analysis can be related to a particular person or place being exposed to radiation. The sequence of steps in disassembling a TLD dosimeter also introduces a risk of damaging or losing the sensors during the movement of the sensors to the processing instruments and incorrect reassembly of the dosimeter when such sensors can be reconditioned for reuse.

In contrast, radiation sensors based on optically stimulated luminescence, i.e., OSL sensors, require only an optical path whereby a stimulating beam of light can illuminate the OSL sensor(s) and the resultant radiation-induced luminescence can be routed back through the same or alternate optical path to a light detector such as a photomultiplier tube that quantifies the amount of luminescent light. In one embodiment, the invention employs an optical path whereby an external beam of light can enter the interior of the holder, illuminate each OSL sensor and enable the luminescent light to exit the holder along the same optical path without the need to remove the sensors from their normal position with respect to any filters or converting materials. The optical path may be either an optical fiber or an uninterrupted air channel through which light can travel.

For more information on OSL materials and systems, see U.S. Pat. No. 5,731,590 issued to Miller, U.S. Pat. No. 6,846,434 issued to Akselrod, U.S. Pat. No. 6,198,108 issued to Schweitzer et al, U.S. Pat. No. 6,127,685 issued to Yoder et al., U.S. patent application Ser. No. 10/768,094 filed by Akselrod et al., all of which are incorporated herein by reference in their entireties. See also Optically Stimulated Luminescence Dosimetry, Lars Botter-Jensen et al., Elesevier, 2003. Klemic, G., Bailey, P., Miller, K., Monetti, M., External radiation dosimetry in the aftermath of radiological terrorist event, Radiat. Prot. Dosim., in press. Akselrod, M. S., Kortov, V. S., and Gorelova, E. A., Preparation and properties of $Al_2O_3$:C, Radiat. Prot. Dosim. 47, 159-64 (1993), and Akselrod, M. S., Lucas, A. C., Polf, J. C., McKeever, S. W. S., Optically stimulated luminescence of $Al_2O_3$:C, Radiation Measurements, 29, (3-4), 391-99 (1998), all of which are incorporated herein by reference in their entireties.

Passive sensors, such as film, TLD or OSL sensors as described above, accumulate and store the dose within the molecular structure of the sensor without any need for electrical power. This characteristic makes passive sensors ideal for situations in which the risk of a power interruption is unacceptable. Optically stimulable crystals and radiation scintillation sensors have been connected to the ends of fiber optic cables so that the sensors can be attached to the measurement instrument without removing the sensors from their locations in the radiation field. The sensors are integrally sealed to the ends of the optical fiber to prevent stray light from interfering with the measurement. The optical fibers connect to the light measurement instrument via a mechanical connector that mates the fiber to the optical pathway created in the instrument. As a single sensor is attached to a single fiber, radiation dosimeters requiring multiple sensors must have multiple fiber connectors that must be individually linked to the photonics system in the instrument. The physical size of the connectors and the need to cap the free end when not joined to the measurement instrument make dosimeters with multiple fiber leads impractical and inconvenient for the wearer.

In one embodiment of the present invention, the design of the radiation dosimeter enables an OSL sensor to be enclosed within the dosimeter, even during reading of the OSL sensor. The radiation dosimeter also provides a means of protecting the OSL sensor and light path from dirt or other things that may alter or affect the amount of stimulating and luminescent light able to travel to and from the OSL sensor(s) and the analytical instrument (dosimeter reader). In one embodiment of the present invention, the OSL sensor may be permanently embedded in a dosimeter mount. In some embodiments of the present invention, the design of the dosimeter reduces the number of parts and the mechanical complexity of the dosimeter. In some embodiments of the present invention, the design of the dosimeter avoids the need of a separate device to open the dosimeter so that the OSL sensor can be removed for analysis. In some embodiments of the present invention, the dosimeter may include a filter for the OSL sensor. For example, the OSL sensor may be a disc of material contained in one or more nested metal cups that behave as one or more filters for the OSL sensor. The use of such cup-shaped filters with OSL sensors is described in U.S. Patent Application No. 2011/0168920 to Yoder, entitled "NOVEL FILTERS FOR USE IN DOSIMETRY," published Jul. 14, 2011.

In one embodiment, the present invention eliminates a number of physical steps, thereby improving productivity and enabling simpler automated handling of large numbers of dosimeters. The design of various embodiments of the present invention provides improved exploitation of the very fast stimulation and luminescence processes that make the analysis of an OSL sensor a very rapid analytical method. Radiation sensors based on measuring electrical signals such as current, voltage or resistance that are changed as a result of exposure to radiation can be connected to a measurement instrument such as an electrometer, voltmeter or pulse counter via wires or other types of conducting pathways. Therefore, the OSL sensor of the present invention may be packaged permanently into the device worn by a user or carried in a user's pocket. Such devices generally require a source of power to establish the voltage gradients needed to attract the ionization created by the radiation in the sensor to an electrode or solid-state collector. These types of devices are generally classed as active in that they can provide an instantaneous indication of the radiation exposure rate. If provided a memory capability, active devices can integrate the rate data to provide an estimate of the accumulated dose.

One of the most difficult tasks in radiation dosimetry is discrimination of the dose created by different radiations, especially neutrons. Accordingly, the neutrons need to be converted to directly ionizing radiation, such as alpha particles, energetic protons, etc., to be detected by such crystals. For dosimetry of fast neutrons, recoil protons from hydrogen-rich plastics, such as high-density polyethylene, are preferred because they are similar to the interactions with water that occur in the body. These converters of neutrons may be associated with, attached to or otherwise in contact with the luminescent material, may be mixed or merged with the luminescent material or may be even be part of or incorporated into the luminescent material. Alpha and beta particles and protons originated from radionuclides and accelerator facilities, as well as heavy charged particles of cosmic rays, usually do not need any conversion.

In one embodiment of the present invention, each OSL sensor comprises an assembly composed of one or more cylindrical cups that act as energy-compensating filters that alter the energy of gamma rays and x-rays able to reach the OSL material. The cups can be formed from one material or have a top and sides of different materials, depending on the angular response desired for the dosimeter. The thickness of the top and walls may be different from each other, depending on the angular response desired for the dosimeter. The shape of the cup walls and top need not be flat or uniform but can be curved and of varying thickness depending on the angular response desired. The cups may be designed in concert with the upper and lower housings, because these also act as energy-compensating filters.

In one embodiment of the present invention, the radiation dosimeter of the present invention may be carried in a user's pocket similar to the way a user would carry a pen. If it is desired to measure several different types of radiation, a user may carry several of the dosimeters of the present invention, with each OSL sensor being unfiltered or including a different type of filter. In one embodiment of the present invention, two or more OSL sensors may be mounted in a dosimeter mount.

When cup-shaped filters are used, the sequence of the metal used in the cups imparts the optimum energy shaping as the lower atomic number elements remove photoelectrons created in the higher atomic number elements by lower energy x-rays. The photoelectrons can impart an undesired response in the OSLM. The cups may be held in the dosimeter mount by compression fit, by using adhesives or by being molded in place so that the dosimeter mount encompasses the cups.

When multiple cups are used for one sensor, they can be held together via a crimping action, compression fit or adhesive. In many embodiments of the present invention, no more than two cups would be used with one contained by the other. This keeps the overall height, cost and assembly at practical values.

Within the cup are converting filters that convert the indirectly ionizing radiations into directly ionizing particles, mainly electrons from gamma rays and x-rays, and recoil protons for neutrons. In addition, the converters create a reflective condition whereby the stimulation light passing through the OSLM is reflected into the OSLM, thereby gaining more effective use of the stimulation light. Similarly, the converters reflect the luminescence light traveling inwards into the cup back out into the cup opening and into the light pipe of the photo-engine in the dosimeter reader.

In one embodiment of a neutron-sensitive OSL sensor of the present invention, the thickness of the HDPE converter that converts the neutrons into recoil protons and the gamma rays/x-rays into electrons is optimized at 1 mm to create a maximum number of recoil protons and electrons. A separate thin piece of HDPE may be added to provide better contact between the OSLM and HDPE.

In one embodiment of the present invention, the thickness of the polytetrafluoroethylene (PTFE) used in the reference OSL sensor and the comparator OSL sensor is such that it converts the gamma rays/x-rays into a similar number of electrons. In this case, its thickness is also 1 mm. The tolerance of the thicknesses of both converters may be ±0.1 mm.

The converters and filters may be retained inside the cups by either adhesives, compression fit or retaining rings that also retain the OSLM in contact with the converters. The retaining ring may be a 0.6 mm diameter wire that fully wraps around the interior diameter of the inner cup. The retaining ring defines the optical readout area of the stimulation light illuminating the OSLM.

In one embodiment, the converters and filters employed with the OSL sensors of the present invention may be flat, while in other embodiments of the present invention the converters may be parabolic to enhance the optical reflection into the light pipe but with added cost.

The grain size of the aluminum oxide particles in an OSLM according to one embodiment of the present invention may be selected based on the range of the recoil protons in the aluminum oxide. Based on Monte Carlo simulations and experimental confirmation tests, this grain size is between 30 and 40 microns for the fast neutron environments of most concern in radiation protection dosimetry. Once the recoil protons have deposited their energy in the aluminum oxide grain, any greater size would not increase the proton response, but since the electrons have a greater range, the response due to the gamma rays/x-rays would increase, thereby reducing the neutron to gamma ray/x-ray signal ratio. Conversely, smaller grains would not fully capture the recoil proton energy, thereby also reducing the neutron to gamma ray/x-ray signal ratio.

The coating of the aluminum oxide grains onto a clear film may be done with binders that have minimal hydrogen so that the reference sensor response is only due to gamma rays and x-rays.

In one embodiment of the present invention, a minimal binder coating is used on top of the grains so as to not to interfere with the recoil protons depositing their energy into the aluminum oxide.

In one embodiment of the present invention, the film on which the aluminum oxide is coated may be transparent to blue and green light and have a thickness ranging between 0.05 and 0.15 mm.

Examples of potential OSL sensors that may be mounted in the dosimeter mount of the present invention include: a neutron-sensitive OSL sensor that senses gamma, x-ray and neutron radiation. a reference sensor that senses only x-ray and gamma radiation, a comparator OSL sensor for a reference sensor, etc. A neutron-sensitive OSL sensor includes an OSLM that is mounted in an inner filter made of a first energy-compensating material, such as aluminum. The inner filter is in turn mounted in an outer filter made of a second energy-compensating material, such as copper. Placed between the inner compensating filter and the OSLM, either as a thin disc, thin layer or thin coating, is a converter material, such as high-density polyethylene, that converts neutrons into recoil protons that can be sensed by the neutron-sensitive OSL sensor. A reference OSL sensor may be identical to the above-described neutron-sensitive OSL sensor, except that instead of the converter material being placed between the inner compensating filter and the OSLM, a reference filter material, such as polytetrafluoroethylene, is placed between the inner compensating filter and the OSLM either as a thin disc, as a thin layer or as a thin coating on the OSLM. A comparator OSL sensor may be identical to the above-described reference OSL sensor, except that the comparator OSL sensor does not include the outer filter of the reference OSL sensor.

In one embodiment of the present invention, the OSLM used in the OSL sensors is a specialized carbon-doped aluminum oxide ($Al_2O_3$:C) material manufactured by Landauer, Inc. (Glenwood, Ill.) and is similar to that marketed in dosimeters with trade names LUXEL+ and INLIGHT. The OSLM consists of specially formulated, proprietary, powderized $Al_2O_3$:C. For use in the OSL sensors of the present invention, the $Al_2O_3$:C material may be in the form a disc-shaped pellet.

In one embodiment of the present invention, exposure of an $Al_2O_3$:C material in an OSL sensors to ionizing radiation releases electrons that are trapped in defects in the material's crystal structure. The electrons are released from the traps when stimulated with 520±10 nm wavelength light (i.e., green). As they return to the ground state, 420±10 nm wavelength light (i.e., blue) is emitted. It should be noted that other light wavelengths could be employed, as could a pulsed stimulation system in reading the OSL sensors of the present invention.

The dosage of gamma ray and x-ray radiation received by the dosimeter and the individual who has been wearing or carrying the dosimeter may be determined from the emitted light from the second or reference OSL sensor and may be modified based on the results of reading the third comparator OSL sensor. The dosage of neutron radiation may be determined by subtracting the dosage value from reading the second OSL sensor from the dosage value from reading the first OSL sensor and multiplying the result by a calibration factor appropriate for the expected neutron energy spectrum.

In one embodiment of the present invention, the dosimeter mount in which an OSL sensor of the present invention is mounted may be made of PE or HDPE.

In one embodiment of the present invention, the dosimeter mount may include an RFID tag. The RFID tag may be held in place by an adhesive transfer tape such as 3M adhesive tape with 300SLE adhesive or alternatively with a UV curable adhesive liquid placed along the edge of the tag.

The dosimeter housing in which the dosimeter mount of the present invention is rotatably mounted may be constructed of polyoxymethylene (POM trade name Delrin® by Dupont), polycarbonate (Lexan), acetylbutylstyrene (ABS) or other suitable plastic material. The dosimeter housing will include an opening that corresponds to each OSL sensor in the dosimeter mount.

In one embodiment of the present invention, a radiation dosimeter or part of a dosimeter, such as a dosimeter mount, includes an RFID tag. The RFID tag includes a radio frequency (RF) antenna that allows the RFID tag to communicate with the RF antenna of an RFID tag reader to allow information/data to be read from the RFID tag by the RFID tag reader and to allow the RFID tag reader to store information on the RFID tag. In one embodiment of the present invention, the RFID tag includes a non-volatile data storage device, such as flash memory, that allows the RFID tag to store information about the radiation dosimeter and the wearer of the radiation dosimeter that enables the reading out of the radiation dosimeter by any reader without having to access a database to retrieve data needed to calculate the dose. When the RFID tag is part of a dosimeter mount, the RFID tag may be read while the sled is in the dosimeter. The dosimeter does not need to be disassembled nor the dosimeter mount removed to read data from and/or write data to the RFID tag. The RFID tag may be read when the dosimeter is in a reading position for an OSL sensor of the dosimeter mount or at a separate reading position for the RFID tag.

The RFID tag may store the results of the last several readouts, thereby enabling the dose history experienced by the wearer to be retrieved. The RFID tag may carry identification, date and time data to establish a chain of custody regarding who was assigned the dosimeter and when certain actions were performed on the dosimeter. In one embodiment of the present invention, the RFID tag may carry the following information: identification information for the dosimeter model, dosimeter serial number and an identification number for the individual to whom the dosimeter is assigned, calibration data for each OSL sensor, date and time information needed to estimate the buildup of background radiation dose, the total radiation dose and the dose from gamma rays and the dose from neutrons, date and time information regarding the assignment of the dosimeter to an individual, date and time information when the dosimeter was read out, and reader quality control data depicting the operability of the dosimeter reader during the analysis of the dosimeter, including the unique reader identification number.

The RFID tag of the present invention may be read and written to using an appropriate RFID antenna and deciphering code either by the dosimeter reader or by a stand-alone RFID tag reader connected to a PC or other data input device. When the dosimeter is returned to a laboratory from the field, the dose results may be separately read out to verify the field results, and the recent history of the dosimeter results obtained in the field may be reviewed to establish an accredited radiation dose record for archiving.

In one embodiment of the present invention, the RFID tag enables the dosimeter to be analyzed in remote areas where there is no access to databases containing information needed for the correct analysis of the dosimeter. The RFID tag carries the history of the analysis of the dosimeter so that a dose reconstruction can be performed. The RFID tag has a limited range of readout to avoid detection of the dosimeter during covert operations.

In one embodiment of the present invention, the dosimeter may be engraved with an identification number that is reproduced in an RFID tag.

In one embodiment, the dosimeter reader may communicate with a database separated from the dosimeter reader. The dosimeter reader may communicate with the separate database in a variety of ways, such as: wireless communication, communicating via an optical fiber, communicating over a wire, communicating over the Internet, communicating over a phone line, etc.

In some embodiments of the present invention, a dosimeter may be given to and worn by an individual before the dosimeter is assigned to the individual in the database. In such cases, the database may be updated at a later date with the name and other identification, such as social security number, dog tag number, etc., for the individual to whom the dosimeter has been assigned. The database may even be updated the first time that the dosimeter is read by a dosimeter reader.

In one embodiment, the dosimeter reader of the present invention is battery operated and can be moved during analysis. The dosimeter reader displays the results of the analysis, performs Pulsed Optically Stimulated Luminescence (POSL) processes, stores results of analyses, writes results of dosimeter analysis to an RFID chip on the dosimeter mount, and has an output mechanism, such as a USB plug, whereby data may be downloaded into a remote database or PC and reader settings may be uploaded to the dosimeter reader. The dosimeter reader may be lightweight and/or watertight and/or floatable. The dosimeter reader may be read out at various angles from the horizontal and includes a display and buttons for operation.

It is preferred that the dosimeter reader may be a mobile dosimeter reader that takes the form of a smartphone, such as an iPhone®. In a smartphone, a built-in LED of the smartphone may be used as a stimulation light source for the OSL sensor of the dosimeter, and built-in camera may function as the detector of the radiation/light emitted by the OSL sensor after stimulation. The hardware and/or software of the smartphone may be used to control the LED and camera of the smartphone and to analyze the radiation detected by the camera. If the smartphone includes a RFID tag reader, the smartphone may be used to read the RFID tag of the dosimeter. The smartphone may also communicate the information obtained by reading the OSL sensor and/or RFID tag of a dosimeter to another computer, smartphone, database, etc. The calibration and the calculation of the dose using a mobile dosimeter reader of the present invention may employ well-established practices for OSL dosimeters. In the continuous mode of operation, the device may also calculate the dose rate, which is calculated as the difference between two consecutive dose readouts. The mobile dosimeter reader may include memory and/or data storage functions, including record keeping and information management of the doses recorded for each OSL sensor and/or dosimeter read by the mobile dosimeter reader.

In one embodiment of the present invention in which the mobile dosimeter reader is a smartphone or an attachment to a smartphone, the mobile dosimeter reader may include application hardware and/or software that is able to control both the LED and the camera of the smartphone either in batch mode or continuously at a frequency that is selectable within the application software. The hardware and/or software of the mobile dosimeter reader may execute routines that enable such hardware and/or software to operate in a calibration mode to establish the necessary calibration coefficient to translate the light emission reading from an OSL material of a known dose to dose and dose rate units. The hardware and/or software of the mobile dosimeter reader may include features that enable the mobile dosimeter reader to be operated either in batch mode as a one-time read of the dose, or continuously at a user-selectable frequency to read both the accumulated dose and the dose rate between such reads from the OSL material. The hardware and/or software of the mobile dosimeter reader may include features that may record the dose and/or the dose rate information into the memory of the smartphone. The hardware and/or software of the mobile dosimeter reader may includes features for associating a time stamp from the internal clock of the smartphone with each recording of the dose and/or dose information. The hardware and/or software of the mobile dosimeter reader may include features for associating the GPS coordinates from the GPS system in the smartphone, if available, with each recording of the dose and/or dose rate information. The hardware and/or software of the mobile dosimeter reader may includes features for linking the mobile dosimeter reader to a remote database host through a mobile phone network. The hardware and/or software of the mobile dosimeter reader may includes features for enabling the smartphone to send the dose and/or dose rate information and the associated time stamp and GPS information, if available, to a remote host system through the mobile phone network. The hardware and/or software of the mobile dosimeter reader may include features for enabling the mobile dosimeter reader to operate in a calibration mode to establish the calibration coefficients for translating the OSL light emission from building materials to an indicator that is useful for nuclear security, nuclear forensics and nuclear safeguards purposes using optical attachment 17/117/217. The hardware and/or software of the mobile dosimeter reader may allow the mobile dosimeter reader to operate in batch mode to record the OSL readout from building materials or equivalent calculated using the calibration method employed by the mobile dosimeter reader. The hardware and/or software of the mobile dosimeter reader may include features for enabling the readout of various pieces of information. The hardware and/or software of the mobile dosimeter reader may include features for enabling the mobile dosimeter reader to operate in a calibration mode to establish the calibration coefficients for translating the OSL light emission from a composite dosimeter into an energy spectrum/radiation type readout. The hardware and/or software of the mobile dosimeter reader may include features for enabling the mobile dosimeter reader to be operated either in real-time or batch mode to record the dose, the dose rate and the energy spectrum/radiation type information using a calibration mode. The hardware and/or software of the mobile dosimeter reader may include features that enable the mobile dosimeter reader to add additional pieces of information to the readout.

In a batch readout mode, the dosimeter is carried in a closed configuration in which the OSL sensor mounted in a dosimeter mount is shielded from ambient light by the dosimeter housing. To read the OSL sensor, the dosimeter may be mounted on a dosimeter reader mount that is mounted on or is part of a smartphone or other dosimeter reader. The dosimeter is then moved to a reading configuration by rotating the dosimeter mount of the dosimeter so that the OSL sensor is aligned with an illumination opening of the dosimeter housing and an opening of the dosimeter reader mount aligned with the OSL reader of the dosimeter reader. The readout of the OSL sensor can be invoked by executing the application in the dosimeter reader that controls the readout and recording and disseminating (if needed) of the readout results from the OSL sensor. When the dosimeter in a reading configuration, the hardware and/or software of the smartphone causes the LED to light up and illuminate the OSL sensor and the dosimeter reader reads the resulting emissions from the OSL sensor beeps when the readout is complete. In the case of a smartphone, the emissions from the OSL sensor may be read by the camera of a smartphone. After the OSL sensor is read, dosimeter mount of the dosimeter may then rotated back to a closed configuration and the dosimeter removed from the dosimeter reader mount, allowing the dosimeter to continue recording the additional dose. The time of the readout will also be recorded and disseminated, if needed, based on the clock time of the dosimeter reader.

Although disc-shaped pellets of OSLM used in the embodiments of the OSL sensors of the present invention are described above and shown in the drawings, the OSLM used in the OSL sensors may have a variety of shapes and cross-sections. When mounted in a filter, the OSLM may have a shape that is complementary to the shape of the filter, such as a disc-shaped pellet of OSLM mounted in a cylindrical cup-shaped filter or a cube or rectangular box-shaped pellet of OSLM mounted in a filter with a rectangular box-shaped recess.

In one embodiment of the present invention, the OSLM may be poured into a cup-shaped filter in a liquid form. When the OSLM solidifies, the OSLM takes on the shape of the recess in the cup-shaped filter.

In one embodiment, the OSLM of the present invention may be a disc-shaped pellet comprising $Al_2O_3$:C made from particles having a grain size of 30-40 µm. The thickness of the pellet may vary depending on the particular application.

In some embodiments of the present invention, the OSL sensors of the present invention may employ filters made of copper and aluminum; the filters of the present invention may be made of other materials that are sensitive to radiation. In one embodiment, the filters may be made of plastic having dispersed therein metal particles or a metal powder. The type of metal used in such a plastic/metal filter and the size of the particles may vary depending on the function of the filter. For example, metals having a large atomic weight may be desirable if the filter is used to remove the presence of low-energy x-rays. The degree of x-ray absorption can be adjusted by changing the concentration and grain size of the metal particles in the plastic/metal filter. Metals having smaller atomic weights may be used in filters designed to provide less energy compensation. The degree of x-ray absorption can be adjusted by changing the concentration and grain size of the metal particles in the plastic/metal filter.

In one embodiment of the present invention, the filters carried by a dosimeter mount may include plastic/metal filters each having different types of metal particles and/or having different concentrations of metal particles and/or having metal particles of different grain sizes dispersed in the plastic material of each filter.

Although in the embodiments shown there are one OSL sensor in the dosimeter mount, in some embodiments of the present invention there may be two, three, four or more OSL sensors in the dosimeter mount. If necessary, four or more sensors may be accommodated in the dosimeter mount by making each of the OSL sensors smaller or making the dosimeter mount longer, thicker or wider.

If necessary, additional sensors and additional types of radiation sensors may be accommodated in the dosimeter mount by making each of the OSL sensors smaller or making the dosimeter mount thicker or wider.

In one embodiment of the present invention, a converter material disc has a thickness of 1 mm to about 1.1 mm. In one embodiment of the present invention, the converter material may be a film or sheet having a thickness of 0.1 mm to about 0.2 mm. In one embodiment, the converter material may be a film of polyethylene having a thickness of less than 1 mm.

In one embodiment the present invention, a reference filter material coating has a thickness of 1 mm to about 1.1 mm. In one embodiment of the present invention, the reference filter material may be a film or sheet having a thickness of 0.1 mm to about 0.2 mm. In one embodiment of the present invention, the reference filter material may be a film of polytetrafluoroethylene having a thickness of less than 1 µm.

In various embodiments of the present invention, including the embodiments shown above and described in the drawings, the radiation dosimeter may include an RFID tag that identifies the radiation dosimeter and the individual associated with the radiation dosimeter, i.e., the individual who has been wearing the radiation dosimeter. The identification information from the RFID tag allows an RFID tag reader that is part of a dosimeter reader to access information about the radiation dosimeter and the individual from a database. Such information may include: the identity of the individual who has been wearing the radiation dosimeter; the last time the radiation dosimeter was read; the serial number of the reader used for the last dosage measurement; a record of the results of previous readings of the dosimeter; a record of the individual's cumulative exposure to various types of radiation; an alphanumeric serial number assigned to the dosimeter; an alphanumeric serial number assigned to the upper housing; an alphanumeric serial number assigned to the lower housing; an alphanumeric serial number assigned to the dosimeter mount; etc. In some embodiments, the dosimeter reader may also transmit information to the database to update the information for the radiation dosimeter and the individual in the database. The database may be stored in the dosimeter reader or stored at another location such as a personal computer, a networked computer, a centralized record database, etc.

Although the identification indicia/alphanumeric serial number assigned to the dosimeter mount and upper housing are identical in the embodiments described above and shown in the drawings, in other embodiments the dosimeter mount and dosimeter housing may be assigned different alphanumeric serial numbers.

FIGS. 1 and 2 show a cylindrically shaped dosimeter mount 102 according to one embodiment of the present invention. Dosimeter mount 102 has a proximal end 104 and a distal end 106. Mounted in a recess 112 of dosimeter mount 102 is a OSLM disc 114. Dosimeter mount 102 includes a cylindrical body 122 having a proximal surface 124. Extending from proximal surface 124 is a cylindrical knob 126. A reading tab 132 and a shielding tab 134 extend perpendicularly from knob 126 and extend beyond sidewall 136 of cylindrical body 122. Reading tab 132 is taller than shielding tab 134. Cylindrical body 122 includes an upper locking recess 142 and a lower locking recess 144. Upper locking recess 142 includes a wider portion 152 and a narrower portion 154. Lower locking recess 144 includes a wider portion 156 and a narrower portion 158.

FIGS. 3 and 4 show a cylindrically shaped dosimeter housing 302 according to one embodiment of the present invention. Dosimeter housing 302 has an open end 304 and a shielded end 306. Dosimeter housing 302 includes a cylindrical recess 308 for receiving dosimeter mount 102. Dosimeter housing 302 includes a illumination opening 312 on a sidewall 314 of dosimeter housing 302. Sidewall 314 also includes two upper tab openings 322 and 324 and two lower tab openings 326 and 328. Open end 304 includes a circular rim 332 from which extend a reading stop 334 and a shielding stop 336. Reading stop 334 is taller than shielding stop 336.

FIGS. 5 and 6 show a cylindrically shaped dosimeter cap 502 according to one embodiment of the present invention. Dosimeter cap 502 has a sidewall 504. FIG. 5 shows dosimeter cap 502 in a shielded orientation in which a shielded configuration end 512 is on top so that a shielded configuration indicator 514 on shielded configuration end 512 is visible. FIG. 5 shows dosimeter cap 502 in a reading orientation in which a reading configuration end 516 is on top so that a reading configuration indicator 518 on reading configuration end 516 is visible. Extending into reading configuration end 516 is a knob recess 522. Extending from knob recess 522, to sidewall 504 and into reading configuration end 516 are: a reading stop recess 524, a reading tab recess 526 and shielding tab-stop recess 528. Extending into shielded configuration end 512 is a knob recess 532. Extending from knob recess 532, to sidewall 504 and into shielded configuration end 512 are: a shielding stop recess 534, a shielding tab recess 536 and a reading tab-stop recess 538.

FIGS. 7 and 8 show a dosimeter 702 according to one embodiment of the present invention in a shielded configuration. Dosimeter 702 comprises dosimeter mount 102, dosimeter housing 302 and dosimeter cap 502. Dosimeter mount 102 is inserted into cylindrical recess 308 (not visible in FIGS. 7 and 8) so that sidewall 136 of dosimeter mount 102 is visible in illumination opening 312 of dosimeter housing 302. In the shielded configuration shown in FIGS. 8 and 9, shielding tab 134 abuts shielding stop 336. Dosimeter cap 502 fits over proximal end 104 of dosimeter mount 102 to lock dosimeter mount 102 in dosimeter housing 302 in the shielded configuration so that OSLM disc 114 is shielded by dosimeter housing 302 and illumination opening 312 of dosimeter housing 302 is not aligned with OSLM disc 114. Dosimeter cap 502 abuts proximal surface 124 of dosimeter mount 102 and rim 332 of dosimeter housing 302. Knob recess 522 fits over knob 126. Reading stop recess 524 fits over reading stop 334, reading tab recess 526 fits over reading tab 132 and shielding tab-stop recess 528 fits over abutting shielding tab 134 and shielding stop 336.

FIG. 9 shows dosimeter 702 in a shielded configuration with dosimeter cap 502 removed. By turning knob 126 about 90° in the direction of arrow 902, dosimeter 702 is placed in a reading configuration shown in FIG. 10 in which illumination opening 312 of dosimeter housing 302 is aligned with OSLM disc 114. In the reading configuration shown in FIG. 10, reading tab 132 abuts reading stop 334 and is prevented from rotating beyond reading stop 334.

FIG. 11 shows dosimeter 702 with dosimeter cap 502 flipped over so that reading configuration indicator 518 is visible and fitted over proximal end 104 of dosimeter mount 102 to lock dosimeter mount 102 in the reading configuration. Knob recess 532 fits over knob 126. Shielding stop recess 534 fits over shielding stop 336 (not visible in FIG. 11), shielding tab recess 536 fits over shielding tab 134 and reading tab-stop recess 538 fits over abutting reading tab 132 and reading stop 334.

FIG. 12 shows a dosimeter reader mount 1202 mounted on a smartphone 1204. Dosimeter reader mount 1202 includes a reading opening 1212. Dosimeter reader mount 1202 also includes two upper mounting tabs 1222 and 1224 and two lower mounting tabs 1226 and 1228. Smartphone 1204 includes a camera 1232 and an LED 1234 that are aligned with reading opening 1212. FIG. 13 shows a curved mounting surface 1302 of dosimeter reader mount 1202. Dosimeter reader mount 1202 is mounted on smartphone 1204 by a spring clip 1242 that fits over a proximal end 1244 of smartphone 1204 and clips dosimeter reader mount 1202 on smartphone 1204.

FIG. 14 shows dosimeter 702 mounted in dosimeter reader mount 1202 so that sidewall 314 of dosimeter housing 302 abuts mounting surface 1302 of dosimeter reader mount 1202.

FIG. 15 shows dosimeter 702 mounted in dosimeter reader mount 1202 while dosimeter 702 is in a shielded configuration. When dosimeter 702 is in the shielded configuration, upper mounting tabs 1222 and 1224 (only upper mounting tab 1222 is visible in FIG. 44) may be inserted into wider portion 152 of upper locking recess 142 and lower mounting tabs 1226 and 1228 (only lower mounting tab 1226 is visible in FIG. 44) to be inserted into wider portion 156 of lower locking recess 144. Once upper mounting tabs 1222 and 1224 and lower mounting tabs 1226 and 1228 are so inserted, dosimeter 702 is pulled upward relative to dosimeter reader mount 1202 as shown by arrow 1502 so that a tab neck 1512 of each of upper mounting tabs 1222 and 1224 abuts an upper edge 1514 of respective upper tab openings 322 and 324 as shown in FIG. 16. Respective distal ends 1522 of upper mounting tabs 1222 and 1224 fit into a recess 1524 formed by upper locking recess 142 and dosimeter housing 302. Also, by pushing dosimeter reader mount 1202 in the direction of arrow 1502, a tab neck 1542 of each of lower mounting tabs 1226 and 1228 abuts an upper edge 1544 of respective lower tab openings 326 and 328. Respective distal ends 1552 of lower mounting tabs 1226 and 1228 fit into a recess 1554 formed by lower locking recess 144 and dosimeter housing 302.

In FIG. 17, dosimeter mount 102 has been rotated using knob 126 so that dosimeter 702 is in a reading configuration so that reading opening 1212 is aligned with illumination opening 312 of dosimeter housing 302 and OSLM disc 114 mounted in dosimeter mount 102. As dosimeter mount 102 is rotated from the position shown in FIG. 16 to the position shown in FIG. 17, upper mounting tabs 1222 and 1224 slide in narrower portion 154 of upper locking recess 142, and lower mounting tabs 1226 and 1228 slide in narrower portion 158 of lower locking recess 144, While upper mounting tabs 1222 and 1224 are in narrower portion 154 of upper locking recess 142 and lower mounting tabs 1226 and 1228 are in narrower portion 158 of lower locking recess 144, dosimeter 702 is prevented from being separated from dosimeter reader mount 1202. In this way, dosimeter 702 cannot be separated from dosimeter reader mount 1202 while dosimeter 702 is in the reading configuration, thereby preventing OSLM disc 114 from being exposed to ambient light while mounted in dosimeter reader mount 1202. To hold dosimeter 702 in the position shown in FIG. 17, dosimeter cap 502 may be fitted over proximal end 104 of dosimeter mount 102 so that the reading configuration end 516 of dosimeter cap 502 is visible.

FIG. 18 shows OSLM disc 114 being read. LED 1234 of smartphone 1204 exposes OSLM disc 114 to light, shown by dashed arrows 1802, and camera 1232 detects the radiation, shown by arrow 1804, emitted by OSLM disc 114.

In one embodiment of the present invention, the dosimeter reader mount, such as dosimeter reader mount 1202, may be part of the dosimeter, such as dosimeter mount 102. In this embodiment, the dosimeter reader mount may be mounted on the dosimeter housing and the dosimeter mount as shown in FIG. 16 for dosimeter reader mount 1202 mounted on dosimeter housing 302 and dosimeter mount 102. Dosimeter reader mount 1202 may be permanently attached to dosimeter housing 302 by an adhesive in this embodiment. When reading of the OSLM disc is desired, the dosimeter reader mount may be mounted on smartphone as shown in FIG. 14.

FIGS. 19 and 20 show a cylindrically shaped dosimeter mount 1902 according to one embodiment of the present invention. Dosimeter mount 1902 has a proximal end 1904 and a distal end 1906. Mounted in a recess 1912 of dosimeter mount 1902 is a OSLM disc 1914. Dosimeter mount 1902 includes a cylindrical body 1922 having a proximal surface 1924. Extending from proximal surface 1924 is a cylindrical knob 1926. A reading tab 1932 and a shielding tab 1934 extend perpendicularly from knob 1926 and extend beyond outer surface 1936 of cylindrical body 1922. Reading tab 1932 is the same height as shielding tab 1934. Cylindrical body 1922 includes a locking recess 1944. Locking recess 1944 includes a wider portion 1956 and a narrower portion 1958. Knob 1926 includes a tab recess 1962 in a proximal end 1964 of knob 1926. Cap stop recess 1962 includes a disc-shaped portion 1966 and an alignment tab recess 1968. A distal mount pin 1972 extends from distal end 1906 of dosimeter mount 1902.

FIGS. 21, 22 and 23 show a cylindrically shaped dosimeter housing 2102 according to one embodiment of the present invention. Dosimeter housing 2102 has an open end 2104 and a shielded end 2106. Dosimeter housing 2102 includes a cylindrical recess 2108 for receiving dosimeter mount 1902. Dosimeter housing 2102 includes a illumination opening 2112 on a sidewall 2114 of dosimeter housing 2102. Sidewall 2114 also includes tab openings 2126 and 2128. Open end 2104 includes a circular rim 2132 from which extend a reading stop 2134 and a shielding stop 2136. Reading stop 2134 is about the same height as shielding stop 2136. Dosimeter housing 2102 includes shielded configuration indicator 2142 and a reading configuration indicator 2144. Cylindrical recess 2108 includes a pin recess 2172.

FIGS. 24, 25, 26, 27, 28, 29 and 30 show a cylindrically shaped dosimeter cap 2402 according to one embodiment of the present invention. Dosimeter cap 2402 has a sidewall 2412, a proximal surface 2414 and a distal surface 2416. Extending through dosimeter cap 2402 is a cylindrical-shaped knob opening 2422. At a proximal end of knob opening 2422 is a cap stop recess 2424, including a disc-shaped recess 2426 from which extends a tab recess 2428. Disc-shaped recess 2426 is wider in diameter than knob opening 2422 as shown in FIG. 30 so that a circular ledge 2430 is formed. Extending from knob opening 2422 to sidewall 2412 on distal surface 2416 of dosimeter cap 2402 are two wide recesses 2432 and 2434 and two narrow recesses 2436 and 2438. Sidewall 2412 and distal surface 2416 include a finger recess 2442. Sidewall 2412 includes a position indicator 2452.

FIGS. 31, 32 and 33 show a cap stop 3102 according to one embodiment of the present invention. Cap stop 3102 includes a disc-shaped portion 3112 and an alignment tab 3114. Disc-shaped portion 3112 includes a disc-shaped recess 3122 in which there is a tab 3124 having a disc-shaped portion 3126 and an alignment tab 3128. Alignment tab 3114 is aligned with alignment tab 3128.

FIGS. 34, 35, 36, 37, 38, 39 and 40 show a dosimeter 3402 according to one embodiment of the present invention that includes dosimeter mount 1902 rotatably mounted in dosimeter housing 2102 so distal mount pin 1972 of dosimeter mount 1902 is received by pin recess 2172 of dosimeter housing 2102. Dosimeter cap 2402 may be slid up and down knob 1926 of distal mount 2902 that is smaller in diameter than knob opening 2422 of dosimeter cap 2402. Cap stop 3102 is mounted on knob 1926 so that disc-shaped recess 3122 fits over proximal end 1964 of knob 1926 and tab 3124 is received by tab recess 1962 of knob 1926. Disc-shaped portion 3226 is received by disc-shaped portion 1966 of tab recess 1962 and alignment tab 3128 is received by alignment tab recess 1968 of tab recess 1962 so that alignment tab 3114 of cap stop 3102 is aligned with alignment tab recess 1968.

FIGS. 34 and 35 show dosimeter 3402 in a shielded configuration in which dosimeter cap 2402 is mounted on dosimeter mount 1902 and dosimeter housing 2102 to lock dosimeter mount 1902 in place relative to dosimeter housing 2102. Wide recess 2432 fits over shielding tab 1934 and shielding stop 2136, wide recess 2434 fits over reading tab 1932 and narrow recess 2436 fits over reading stop 2134. Position indicator 2452 of dosimeter cap 2402 is aligned with shielded configuration indicator 2142 of dosimeter housing 2102, indicating that dosimeter 3402 is in a shielded configuration. As shown in FIGS. 34 and 35, knob 1926 is narrower than knob recess of dosimeter cap 2402, thereby allowing dosimeter cap 2402 to be slid on knob 1926 when dosimeter cap 2402 is not engaged with dosimeter mount 1902, dosimeter housing 2102 and cap stop 3102.

As shown in FIGS. 35 and 36, shielding tab 1934 of dosimeter mount 1902 abuts shielding stop 2136 of dosimeter housing when dosimeter 2102 is in a shielded configuration Also, as can be seen in FIG. 36, shielding stop 2136 prevents shielding tab 1934 and dosimeter mount 1902 from being rotated beyond shielding stop 2136, even when dosimeter cap 2402 is removed.

FIG. 36 shows dosimeter cap 2402 lifted from dosimeter mount 1902 and dosimeter housing 2102. To make sure that dosimeter mount 1902 is not pulled up accidentally when dosimeter cap 2402 is lifted up, a user may insert a finger or thumb in finger recess 2442 and hold down on dosimeter mount 1902 and dosimeter housing 2102 as dosimeter cap 2402 is lifted up.

Figure 37:
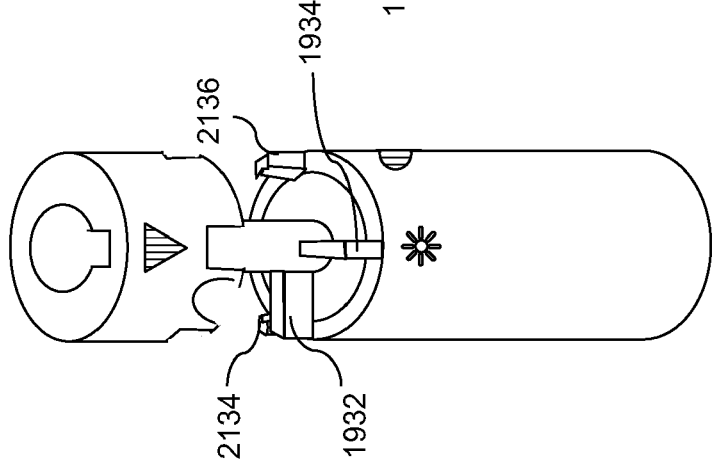
FIG. 37 is a perspective view of the dosimeter of FIG. 35 in a reading configuration with the dosimeter cap engaging the cap stop of the dosimeter.

As shown in FIG. 36, dosimeter cap 2402 is lifted up until stopped by cap stop 3102 which fits into cap stop recess 2424 allowing a user to turn dosimeter cap 2402, and thereby rotating knob 1926 and dosimeter mount 1902 in the direction shown by arrow 3612 until dosimeter 3402 is in a reading configuration shown in FIG. 37 in which reading tab 1932 of dosimeter mount 1902 abuts reading stop 2134 of dosimeter housing, thereby preventing dosimeter mount 1902 from rotating beyond reading stop 2134.

Figure 39:
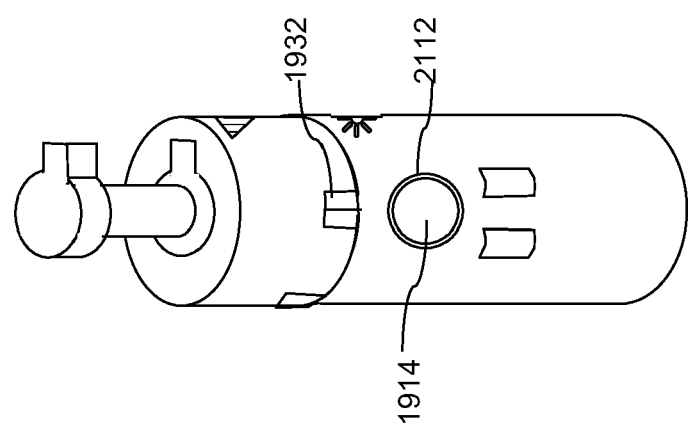
FIG. 39 is a perspective view of the dosimeter of FIG. 38 in a reading configuration and rotated about 90° from the view of FIG. 38.
Figure 38:
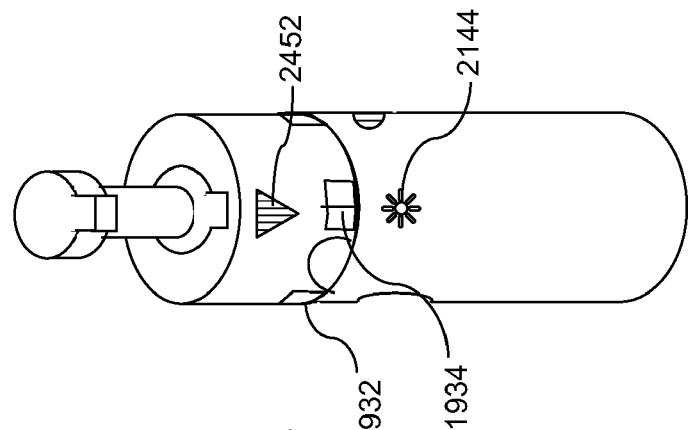
FIG. 38 is a perspective view of the dosimeter of FIG. 37 in a reading configuration with the dosimeter cap engaging a dosimeter mount and a dosimeter housing of the dosimeter.

FIGS. 38, 39 and 40 show dosimeter cap 2402 fitted over dosimeter mount 1902 and dosimeter housing 2102 so that wide recess 2432 of dosimeter cap 2402 is fitted over shielding tab 1934 of dosimeter mount 1902, wide recess 2434 of dosimeter cap 2402 is fitted over reading tab 1932 of dosimeter mount 1902 and reading stop 2134 of dosimeter housing 2102, and narrow recess 2438 is fitted over shielding stop 2136 of dosimeter housing 2102. As shown in FIG. 39, OSLM disc 1914 is exposed by illumination opening 2112 of dosimeter housing 2102 when dosimeter 3402 is in a reading position, allowing OSLM disc 1914 to be read by an OSL reader. OSLM disc 1914 may be read with dosimeter cap 2402 either lifted up as shown in FIG. 37 or fitted over dosimeter mount 1902 and dosimeter housing 2102 as shown in FIGS. 38, 39, and 40. As shown in FIG. 38, when dosimeter 3402 is in a reading configuration, position indicator 2452 is aligned with reading configuration indicator 2144 of dosimeter housing 2102.

FIGS. 41 and 42 shows a smartphone cover 4102 including dosimeter reader mount 4104 formed by a recess portion of smartphone cover 4102. Smartphone cover 4102 may be made of a resilient material such as rubber or plastic and is fitted over a back 4106 of a smartphone 4108 and over the edges 4110 of a front 4112 of smartphone 4108 in the manner of conventional smartphone protective covers. Dosimeter reader mount 4104 includes a reading opening 4122. Dosimeter reader mount 4104 includes mounting tabs 4136 and 4138. Smartphone 4108 includes a camera 4142 and an LED 4144 that are aligned with reading opening 4122. FIG. 42 shows a curved mounting surface 4152 of dosimeter reader mount 4104.

FIG. 43 shows dosimeter 3402 mounted in dosimeter reader mount 4104 so that sidewall 2114 of dosimeter housing 2102 abuts mounting surface 4202 of dosimeter reader mount 4104. FIGS. 42 and 43 show back 4106 and front 4212 of smartphone 4108.

FIG. 44 shows dosimeter 3402 mounted in dosimeter reader mount 4104 while dosimeter 3402 is in a shielded configuration. When dosimeter 3402 is in the shielded configuration, mounting tabs 4136 and 4138 (only mounting tab 4136 is visible in FIG. 44) may be inserted into wider portion 1956 of locking recess 1944 of dosimeter mount 1902. Once mounting tabs 4136 and 4138 are so inserted, dosimeter 3402 is pulled upward relative to dosimeter reader mount 4104 as shown by arrow 4402 so that a tab neck 4442 of each of mounting tabs 4136 and 4138 abuts an upper edge 4444 of respective tab openings 2126 and 2128 as shown in FIG. 45. Respective distal ends 4452 of mounting tabs 4136 and 4138 fit into a recess 4454 formed by upper locking recess 1944 and sidewall 2114 of dosimeter housing 2102.

In FIG. 46, dosimeter mount 1902 has been rotated using dosimeter cap 2402 and knob 1926 so that dosimeter 3402 is in a reading configuration so that reading opening 4122 is aligned with illumination opening 2112 of dosimeter housing 2102 and OSLM disc 1914 is mounted in dosimeter mount 1902. As dosimeter mount 1902 is rotated from the position shown in FIG. 45 to the position shown in FIG. 46, mounting tabs 4136 and 4138 slide in narrower portion 1958 of locking recess 1944. While mounting tabs 4136 and 4138 are in narrower portion 1958 of locking recess 1944, dosimeter 3402 is prevented from being separated from dosimeter reader mount 4104. In this way, dosimeter 3402 cannot be separated from dosimeter reader mount 4104 while dosimeter 3402 is in the reading configuration, thereby preventing OSLM disc 1914 from being exposed to ambient light while mounted in dosimeter reader mount 4104. To hold dosimeter 702 in the position shown in FIG. 46, dosimeter cap 2402 may be fitted over proximal end 1904 of dosimeter mount 1902

In the reading configuration shown in FIG. 16, OSLM disc 1914 may be illuminated by LED 4144 of smartphone 4108 and the emitted radiation detected by camera 4142 in a fashion similar to that shown in FIG. 18 for OSLM disc 114 of dosimeter 702 with smartphone 1204.

FIGS. 47 and 48 show a cylindrically shaped dosimeter mount 4702 according to one embodiment of the present invention. Dosimeter mount 4702 has a proximal end 4704 and a distal end 4706. Mounted in a recess 4712 of dosimeter mount 4702 is an OSLM disc 4714. Dosimeter mount 4702 includes a cylindrical body 4722 having a proximal surface 4724. Extending from proximal surface 4724 is a cylindrical knob 4726. A reading tab 4732 and a shielding tab 4734 extend perpendicularly from knob 4726 and extend beyond outer surface 4736 of cylindrical body 4722. Reading tab 4732 is the same height as shielding tab 4734. Cylindrical body 4722 includes a locking recess 4744. Locking recess 4744 includes a wider portion 4756 and a narrower portion 4758. A distal axle 4772 extends from distal end 4706 of dosimeter mount 4702.

FIGS. 49 and 50 show a cylindrically shaped dosimeter housing 4902 according to one embodiment of the present invention. Dosimeter housing 4902 has an open end 4904 and a shielded end 4906. Dosimeter housing 4902 includes a cylindrical recess 4908 for receiving dosimeter mount 1902. Dosimeter housing 4902 includes a illumination opening 4912 on a sidewall 4914 of dosimeter housing 4902. Sidewall 4914 also includes tab openings 4926 and 4928. Open end 4904 includes a circular rim 4932 from which extend a reading stop 4934 and a shielding stop 4936. Reading stop 4934 is about the same height as shielding stop 4936. Dosimeter housing 4902 includes a shielded configuration indicator 4942 and a reading configuration indicator 4944. Cylindrical recess 4908 includes an axle opening 4972 through which distal axle 4772 extends when dosimeter mount 4702 is rotatably mounted in dosimeter housing 4902.

FIGS. 51, 54, 55 and 56 show a cylindrically shaped dosimeter cap 5102 according to one embodiment of the present invention. Dosimeter cap 5102 has a sidewall 5112, a proximal surface 5114 and a distal surface 5116. Extending from a knob recess 5122 to sidewall 5112 on distal surface 5116 of dosimeter cap 5102 are two wide recesses 5132 and 5134 and two narrow recesses 5136 and 2438. Sidewall 5112 includes a position indicator 5152.

FIG. 55 shows a distal axle cap 5502 according to one embodiment of the present invention. Distal axle cap 5502 includes a cylindrical recess 5512 for fitting over distal axle 4772 of dosimeter mount 4702. In some embodiments of the present invention, cylindrical recess 5512 may include interior screw threads and distal axle 4772 may include complementary exterior screw threads so that distal axle cap may be screwed onto distal axle 4772. In some embodiments of the present invention, distal axle cap 5502 may be permanently fixed to distal axle 4772 with an adhesive.

FIGS. 56 and 57 show a dosimeter 5602 comprising dosimeter mount 4702, dosimeter housing 4902, dosimeter cap 5102 and distal axle cap 5502. When dosimeter mount 4702 is rotatably mounted in dosimeter housing 4902 and distal axle cap 5502 is permanently or removably fixed to distal axle 4772, as shown in FIGS. 56 and 57, distal axle cap 5502 prevents dosimeter mount 4702 from being moved proximally or distally within dosimeter housing 4902. FIG. 56 shows dosimeter 5602 in a shielded configuration, and FIG. 57 shows dosimeter 5602 in a reading configuration.

Dosimeter 5602 may be read by a dosimeter reader, such as smartphone 4108, in a fashion similar to the way that dosimeter 3402 is read by a dosimeter reader and may be mounted on a dosimeter reader mount on a dosimeter reader in a fashion similar to the way that dosimeter 3402 is mounted on a dosimeter reader.

Although in the embodiments described above and shown in the drawings, the dosimeter is locked in a reading configuration by replacing the cap on the dosimeter in the reading configuration, in some embodiments of the present invention the OSLM disc may be read without locking the dosimeter with a dosimeter cap.

Although particular features such tabs, tab arrangements, markings, openings, recesses, recess arrangements, the use of a dosimeter pin, the use of a dosimeter mount axle, the use of an axle cap, finger openings, etc. are shown as being part of particular dosimeter mounts, dosimeter housings, dosimeter caps and dosimeters in the drawings figures, many of these features may be used in various embodiments of the present invention. For example, any of the dosimeter mounts shown in the drawings could include a dosimeter mount axle and be used with a dosimeter housing including an opening through which the axle extends and an axle cap.

Although the above-described embodiments of the present invention describe using a mobile dosimeter that is a smartphone, a part of a smartphone or an accessory of a smartphone as the reader for the dosimeter of the present invention, in other embodiments, other types of dosimeter readers may be used to read the dosimeter of the present invention. For example, United States Patent Application 2011/0168921 to Yoder, entitled, "PORTABLE READER FOR A DOSIMETER," published Jul. 14, 2011 describes a portable dosimeter and photo-optical engine that may be adapted to read a dosimeter of the present invention by using an appropriate dosimeter reader mount for mating with the dosimeter during reading. The light source to which the piece of OSL material in the dosimeter is exposed is generally chosen to have a wavelength that causes the particular OSL material to luminesce.

The dosimeter mount and dosimeter housing of a dosimeter of the present invention may be made of materials such as plastic and/or rubber. Other parts of a dosimeter of the present invention may also be made of materials such as plastic and/or rubber.

While the present invention has been disclosed with references to certain embodiments, numerous modifications, alterations and changes to the described embodiments are possible without departing from the spirit and scope of the present invention, as defined in the appended claims. Accordingly, it is intended that the present invention not be limited to the described embodiments, but that it has the full scope defined by the language of the following claims, and equivalents thereof.

What is claimed is:

1. A device comprising:
   a cylindrically shaped dosimeter mount,
   a piece of optically stimulated luminescence material (OSLM) mounted in the dosimeter mount,
   a cylindrically shaped dosimeter housing comprising a cylindrical recess in which the dosimeter mount is rotatably mounted,
   a cylindrically shaped knob extending from a proximal end of the dosimeter mount,
   wherein the piece of OSLM has an exposed surface,
   wherein the device has an a reading configuration in which the exposed surface of the piece of OSLM is exposed in an opening of the dosimeter housing,
   wherein the device has a shielded configuration in which the exposed surface of the piece of OSLM is shield by the dosimeter housing,
   wherein the device is movable between the shielded configuration and the reading configuration by rotating the dosimeter mount relative to the dosimeter housing about a longitudinal axis by twisting the knob.

2. The device of claim 1, wherein the dosimeter housing includes one or more first engaging structures for interacting with one or more complementary second engaging structures on the dosimeter mount for preventing the dosimeter mount from rotating beyond the reading configuration in a first rotational direction.

3. The device of claim 1, wherein the dosimeter housing includes one or more first engaging structures for interacting with one or more complementary second engaging structures on the dosimeter mount for preventing the dosimeter mount from rotating beyond the shielded configuration in a first rotational direction.

4. The device of claim 1, further comprising a dosimeter cap having a first orientation for locking the device in the shielded configuration, the dosimeter cap comprising:
   first engaging structures for engaging second engaging structures of the dosimeter mount and dosimeter housing to lock the device in the shielded configuration, and
   a recess for receiving the knob of the dosimeter mount when the first engaging structures engage the second engaging structures.

5. The device of claim 1, further comprising a dosimeter cap having a first orientation for locking the device in the shielded configuration, the dosimeter cap comprising:
   first engaging structures for engaging second engaging structures of the dosimeter mount and dosimeter housing to lock the device in the shielded configuration, and
   an opening for through which the knob of the dosimeter mount extends when the first engaging structures engage the second engaging structures.

6. The device of claim 1, wherein the device comprises dosimeter reader mount engaging structures for engaging a dosimeter reading mount to mount the device on the dosimeter reader mount when the device is in an open position and for preventing the dosimeter reading mount from disengaging from the device when the device is mounted on the dosimeter reader mount and the device is in a reading configuration.

7. The device of claim 1, wherein the dosimeter mount includes an axle at a distal end of the dosimeter mount, wherein the dosimeter housing includes an axle opening through which a portion of the axle extends, and wherein the device comprises an axle cap for engaging the portion of the axle extending through the axle opening to thereby prevent the dosimeter mount from moving in a distal direction.

8. The device of claim 1, wherein the piece of OSLM comprises an OSLM disc.

9. The device of claim 1, wherein the OSLM comprises aluminum oxide.

10. A method comprising the following steps:
  (a) moving a dosimeter from a shielded configuration to a reading configuration by rotating a dosimeter mount of a dosimeter about a longitudinal axis in a dosimeter housing of a dosimeter or by rotating the dosimeter housing around the dosimeter mount about the longitudinal axis,
  (b) exposing a piece of optically stimulated luminescence material (OSLM) in the dosimeter mount to light through an opening in a dosimeter housing, and
  (c) detecting radiation emitted by the piece of OSLM in response to step (b).

11. The method of claim 10, wherein the method comprises the following step:
  (d) after step (c) is conducted, moving the dosimeter from the reading configuration to the shielded configuration by rotating the dosimeter mount about a longitudinal axis in a dosimeter housing of the dosimeter or by rotating the dosimeter housing around the dosimeter mount about the longitudinal axis.

* * * * *